US012499507B2

(12) United States Patent
Lee et al.

(10) Patent No.: US 12,499,507 B2
(45) Date of Patent: Dec. 16, 2025

(54) ORAL IMAGE PROCESSING DEVICE AND ORAL IMAGE PROCESSING METHOD

(71) Applicant: MEDIT CORP., Seoul (KR)

(72) Inventors: Dong Hoon Lee, Seoul (KR); Sung Bin Im, Seoul (KR)

(73) Assignee: MEDIT CORP., Seoul (KR)

( * ) Notice: Subject to any disclaimer, the term of this patent is extended or adjusted under 35 U.S.C. 154(b) by 390 days.

(21) Appl. No.: 18/020,468

(22) PCT Filed: Aug. 11, 2021

(86) PCT No.: PCT/KR2021/010655
§ 371 (c)(1),
(2) Date: Mar. 21, 2023

(87) PCT Pub. No.: WO2022/035221
PCT Pub. Date: Feb. 17, 2022

(65) Prior Publication Data
US 2023/0306554 A1 Sep. 28, 2023

(30) Foreign Application Priority Data

Aug. 14, 2020 (KR) .......................... 10-2020-0102707

(51) Int. Cl.
*G06T 3/40* (2024.01)
*A61B 1/00* (2006.01)
*A61B 1/24* (2006.01)

(52) U.S. Cl.
CPC ............ *G06T 3/40* (2013.01); *A61B 1/00006* (2013.01); *A61B 1/000096* (2022.02);
(Continued)

(58) Field of Classification Search
CPC ................... G06T 3/40; G06T 7/0012; G06T 2207/10016; G06T 7/579; G06T 7/70;
(Continued)

(56) References Cited

U.S. PATENT DOCUMENTS

2007/0098237 A1  5/2007 Yoo et al.
2015/0320320 A1  11/2015 Kopelman et al.
2018/0028294 A1  2/2018 Azernikov et al.
(Continued)

FOREIGN PATENT DOCUMENTS

FR  2 977 473 A1  1/2013
JP  2005-182498 A  7/2005
(Continued)

OTHER PUBLICATIONS

International Search Report for PCT/KR2021/010655 dated Dec. 6, 2021.
(Continued)

*Primary Examiner* — Helen Zong
(74) *Attorney, Agent, or Firm* — Sughrue Mion, PLLC

(57) ABSTRACT

According to embodiments, disclosed are a device and method for processing an intraoral image. The disclosed method of processing an intraoral image includes displaying the intraoral image based on a scan region of interest having a first size, detecting a predetermined event, based on detecting the predetermined event, adjusting the size of the scan region of interest from the first size to a second size, and displaying the intraoral image based on the scan region of interest having the adjusted second size.

20 Claims, 18 Drawing Sheets

(52) U.S. Cl.
CPC ...... *A61B 1/00039* (2013.01); *A61B 1/00045* (2013.01); *A61B 1/00172* (2013.01); *A61B 1/24* (2013.01)

(58) Field of Classification Search
CPC . G06T 2207/20081; G06T 2207/20084; G06T 2207/30036; G06T 5/00; A61B 1/00006; A61B 1/000096; A61B 1/00039; A61B 1/00045; A61B 1/00172; A61B 1/24; A61B 5/0033; A61B 5/0062; A61B 5/0088; A61B 5/7264; A61B 2576/00; A61C 9/0053; A61C 9/0046
See application file for complete search history.

(56) References Cited

U.S. PATENT DOCUMENTS

| | | | | |
|---|---|---|---|---|
| 2022/0071578 A1* | 3/2022 | Schildkraut | ............ | A61B 6/032 |
| 2022/0110596 A1* | 4/2022 | Schildkraut | ............ | A61B 6/512 |
| 2022/0164954 A1* | 5/2022 | Kim | ..................... | G06T 7/70 |

FOREIGN PATENT DOCUMENTS

| | | | | |
|---|---|---|---|---|
| JP | 2005182498 | * | 7/2005 | ............... A61B 5/00 |
| KR | 10-2008-0080291 A | | 9/2008 | |
| KR | 10-2016-0149301 A | | 12/2016 | |
| KR | 10-2019-0000488 A | | 1/2019 | |
| KR | 10-2019-0032800 A | | 3/2019 | |
| WO | WO-2020005912 A1 | * | 1/2020 | ......... A61C 13/0004 |

OTHER PUBLICATIONS

Korean Office Action for Korean Application No. 10-2020-0102707 dated Nov. 12, 2021, 11 pages.
Korean Final Rejection Office Action for Korean Application No. 10-2020-0102707 dated Apr. 29, 2022, 8 pages.
Korean Notice of Allowance Office Action for Korean Application No. 10-2020-0102707 dated Aug. 25, 2022, 10 pages.
Extended European Search Report issued Jul. 15, 2024 in European Application No. 21856227.0.

* cited by examiner

FIG. 7
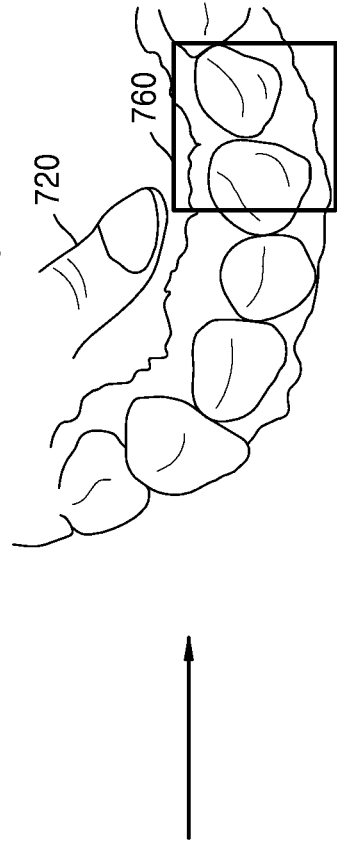
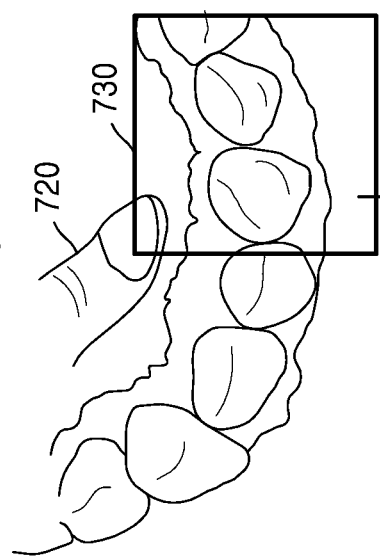
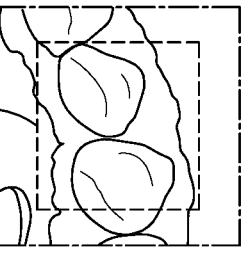
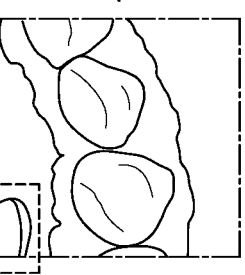

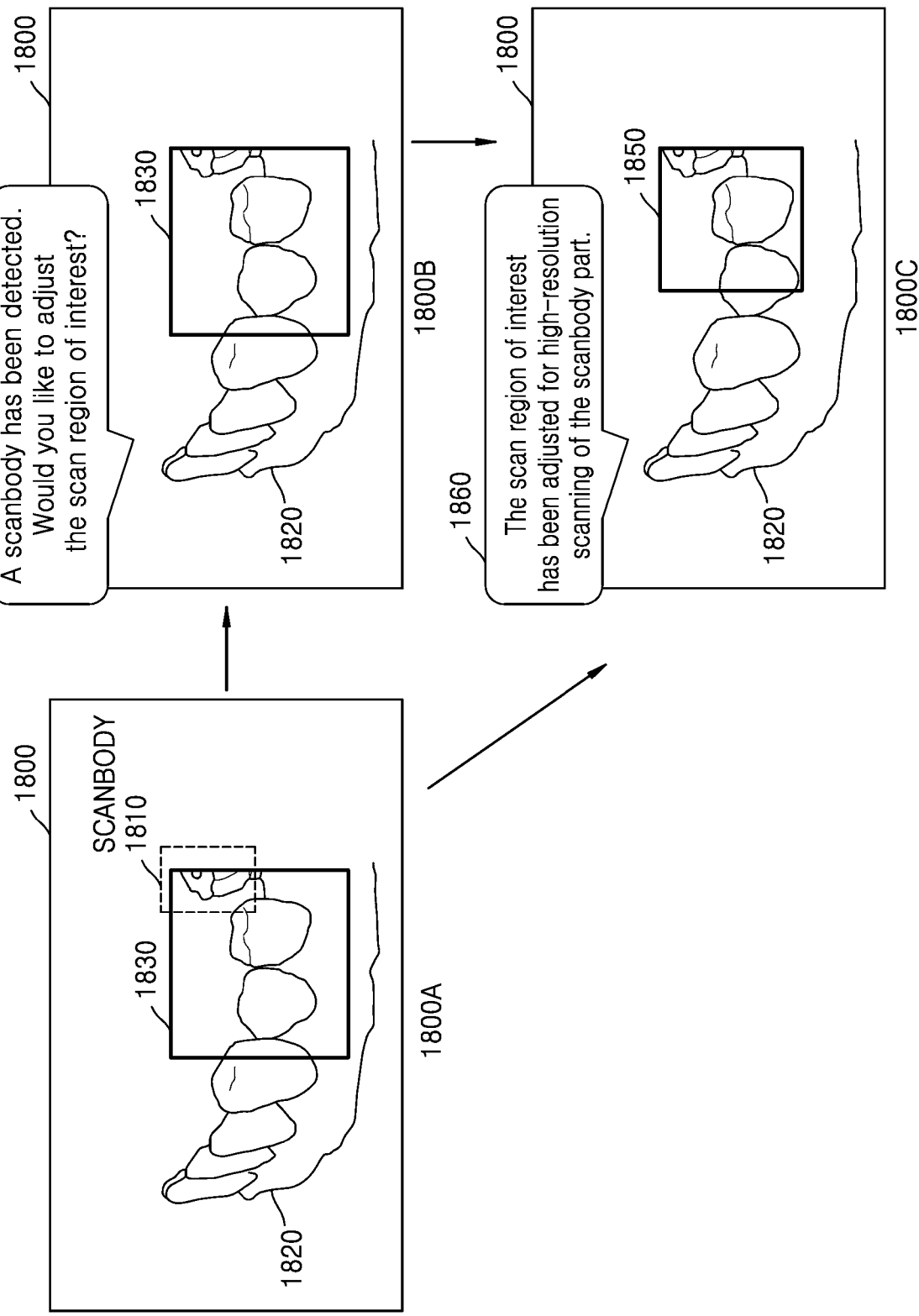

ORAL IMAGE PROCESSING DEVICE AND ORAL IMAGE PROCESSING METHOD

CROSS REFERENCE TO RELATED APPLICATIONS

This application is a National Stage of International Application No. PCT/KR2021/010655 filed Aug. 11, 2021, claiming priority based on Korean Patent Application No. 10-2020-0102707 filed Aug. 14, 2020.

TECHNICAL FIELD

The disclosed embodiments relate to an intraoral image processing device and an intraoral image processing method.

More particularly, the disclosed embodiments relate to an intraoral image processing device capable of adjusting a scan region of interest, and a processing method thereof.

BACKGROUND ART

Recently, as a method of obtaining oral cavity information of a patient, a method of inserting an intraoral scanner into the oral cavity of the patient to obtain an intraoral image has been used. By scanning the oral cavity of the patient by using the intraoral scanner, maxillary scan data, mandibular scan data, and scan data regarding occlusion of the upper and lower jaws may be obtained. A three-dimensional virtual model may be generated by using the obtained scan data, and treatment of teeth or correction of misalignment of teeth may be performed by using the generated three-dimensional virtual model.

The intraoral scanner may obtain two-dimensional data containing an intraoral image, and the obtained two-dimensional data may be used to create a three-dimensional virtual model. Because such a three-dimensional virtual model three-dimensionally represents an image of teeth or the like in an oral cavity, it is important to process the three-dimensional virtual model such that foreign objects other than intraoral objects such as teeth are not included in the three-dimensional virtual model. In addition, it may be difficult for an intraoral scanner to obtain data regarding dental appliances made of a particular material other than teeth in the oral cavity, that is as accurate as data regarding the teeth, and obtaining of accurate scan data regarding such dental appliances made of a particular material may also be required.

DISCLOSURE

Technical Problem

The disclosed embodiments are to provide an intraoral image processing method for processing a three-dimensional virtual model such that foreign objects other than intraoral objects such as teeth are not included or such that more accurate image processing is performed on a particular object, an apparatus for performing operations of the method, and a computer-readable storage medium having recorded thereon a program for performing the method.

Technical Solution

According to an embodiment, provided are a method of processing an intraoral image including displaying the intraoral image based on a scan region of interest having a first size, detecting a predetermined event, based on detecting the predetermined event, adjusting the size of the scan region of interest from the first size to a second size, and displaying the intraoral image based on the scan region of interest having the adjusted second size, and a device for performing the method.

Advantageous Effects

An intraoral image processing method, a device for performing operations thereof, and a computer-readable storage medium having recorded thereon a program for performing the method according to the disclosed embodiments may provide an effect of adjusting the size of a scan region of interest without physically adjusting settings of an optical part. By performing image processing to adjust the size of a scan region of interest as described above, a three-dimensional virtual model may be processed such that foreign objects are not included in the scan region of interest, or the resolution of an image corresponding to the scan region of interest may be increased and then provided.

DESCRIPTION OF DRAWINGS

The present disclosure may be readily understood with a combination of the following detailed descriptions and the accompanying drawings, wherein reference numbers refer to structural elements.

FIG. 7 is a reference diagram for describing an operation of generating a three-dimensional virtual model image by adjusting the size of a scan region of interest, according to an embodiment.

FIG. 18 illustrates an example of a user interface for asking a user whether to adjust a scan region of interest in a case in which an electronic device detects a foreign object or a predetermined object, according to an embodiment.

BEST MODE

Figure 1:
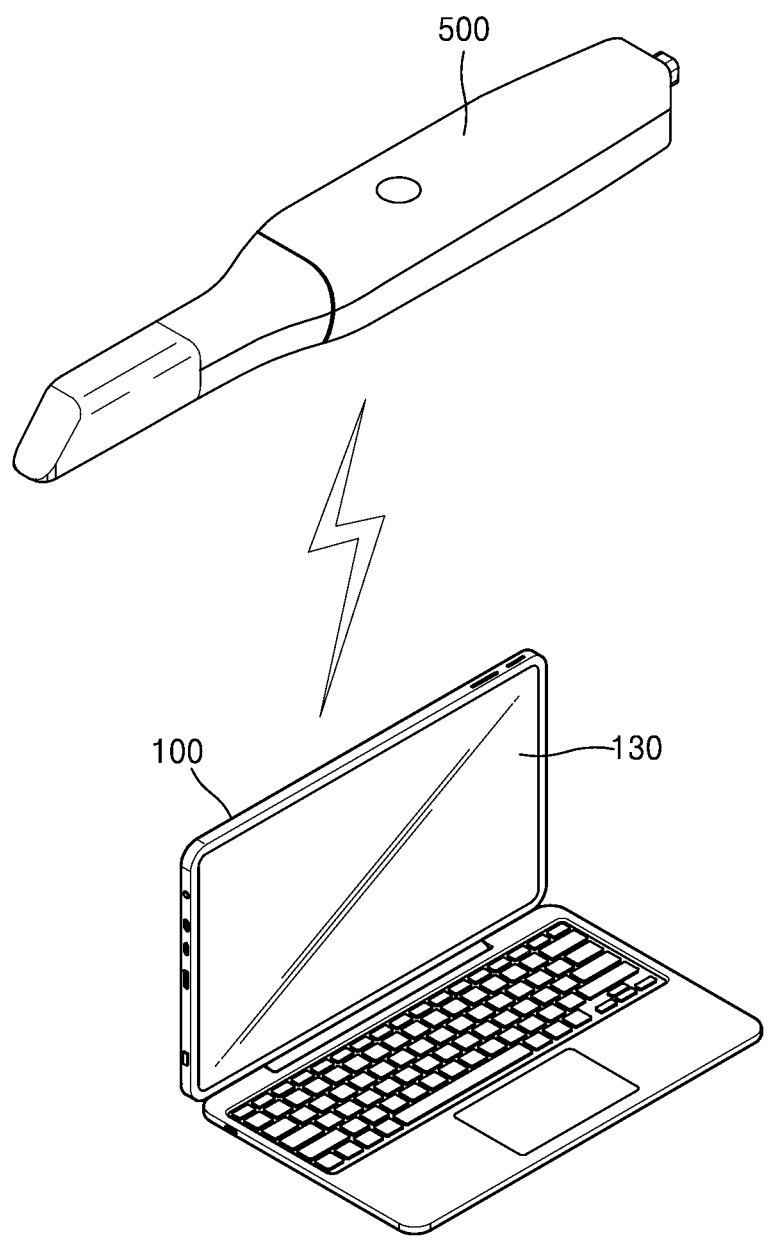
FIG. 1 is a diagram for describing an intraoral image processing system according to an embodiment of the present disclosure.

According to an embodiment, a method of processing an intraoral image includes displaying the intraoral image based on a scan region of interest having a first size, detecting a predetermined event, based on detecting the predetermined event, adjusting the size of the scan region of interest from the first size to a second size, and displaying the intraoral image based on the scan region of interest having the adjusted second size.

According to an embodiment, the predetermined event may include at least one of receiving a user input for instructing to adjust the size of the scan region of interest, detecting a foreign object in the intraoral image, or detecting a predetermined object in the intraoral image.

According to an embodiment, an interface for receiving the user input for instructing to adjust the size of the scan region of interest may be implemented by a user interface in an intraoral scanner or a graphical user interface of a device processing the intraoral image.

According to an embodiment, the method of processing an intraoral image may further include increasing or decreasing the size of the scan region of interest, according to the user input.

According to an embodiment, the method of processing an intraoral image may further include, based on decreasing the size of the scan region of interest, increasing the resolution of the scan region of interest.

According to an embodiment, the method of processing an intraoral image may further include transmitting, to the intraoral scanner, a control signal indicating adjusting the size of the scan region of interest from the first size to the second size, in response to the transmitting of the control signal, receiving, from the intraoral scanner, scan data corresponding to the second size of the scan region of interest, and generating the intraoral image corresponding to the scan region of interest having the second size, based on the received scan data.

According to an embodiment, the method of processing an intraoral image may further include using one or more neural networks to detect the foreign object in the intraoral image.

According to an embodiment, the predetermined object detected in the intraoral image may include a dental treatment auxiliary device made of a particular material.

According to an embodiment, a device for processing an intraoral image includes a processor, and a memory, and the processor is configured to execute one or more instructions stored in the memory to display the intraoral image based on a scan region of interest having a first size, detect a predetermined event, based on detecting the predetermined event, adjust the size of the scan region of interest from the first size to a second size, and display the intraoral image based on the scan region of interest having the adjusted second size.

According to an embodiment, in a non-transitory computer-readable recording medium having recorded thereon a program including at least one instruction for a computer to perform a method of processing an intraoral image, the method of processing an intraoral image includes displaying the intraoral image based on a scan region of interest having a first size, detecting a predetermined event, based on detecting the predetermined event, adjusting the size of the scan region of interest from the first size to a second size, and displaying the intraoral image based on the scan region of interest having the adjusted second size.

MODE FOR INVENTION

In the present specification, the principle of the present disclosure is explained and embodiments thereof are disclosed in such a manner that the scope of the present disclosure should become apparent and the present disclosure may be carried out by those of skill in the art to which the present disclosure pertains. The disclosed embodiments may be implemented in various forms.

Like reference numerals denote like elements throughout the present specification. The present specification does not describe all elements of embodiments, and general content in the art to which the present disclosure pertains or identical content between the embodiments will be omitted. The terms "part" and "portion" as used herein may be embodied as software or hardware, and a plurality of "parts" may be embodied as a single unit or element, while a single "part" may include a plurality of elements, according to embodiments. Hereinafter, an operating principle and embodiments of the present disclosure will be described with reference to the accompanying drawings.

In the preset specification, an image (hereinafter, referred to as an 'intraoral image') may include an image representing at least one tooth or an oral cavity including at least one tooth.

In addition, in the present specification, an image may be a two-dimensional image of an object or a three-dimensional model or three-dimensional image representing the object in three dimensions. In addition, in the present specification, an image may refer to data required to represent an object in two dimensions or three dimensions, for example, raw data obtained by at least one image sensor. In detail, the raw data is data obtained to generate an intraoral image, and may be data (e.g., two-dimensional data) obtained by at least one image sensor included in an intraoral scanner when a patient's oral cavity that is an object is scanned by using the intraoral scanner. The raw data obtained by the intraoral scanner may be referred to as scan data or two-dimensional image data.

In the present specification, an 'object' may include a tooth, gingiva, at least a partial region of an oral cavity, and/or an artificial structure insertable into an oral cavity (e.g., an orthodontic device, an implant, an artificial tooth, an orthodontic auxiliary tool inserted into an oral cavity, etc.). Here, the orthodontic device may include at least one of a bracket, an attachment, an orthodontic screw, a lingual orthodontic device, and a removable orthodontic retainer.

Hereinafter, embodiments will be described in detail with reference to the drawings.

FIG. 1 is a diagram for describing an intraoral image processing system according to an embodiment of the present disclosure.

Referring to FIG. 1, an intraoral scanner 500 is a medical device for obtaining an intraoral image.

In detail, the intraoral scanner 500 may be a device for obtaining an image of an oral cavity including at least one tooth, by being inserted into the oral cavity and scanning teeth in a contactless manner. In addition, the intraoral scanner 500 may have a shape capable of being drawn in and out of an oral cavity, and scans the oral cavity of a patient by using at least one image sensor (e.g., an optical camera, etc.). The intraoral scanner 500 may obtain, as raw data, surface information about an object, in order to image the surface of at least one of a teeth, gingiva, and an artificial structure (e.g., an orthodontic device including a bracket and a wire, an implant, an artificial tooth, an orthodontic auxiliary tool inserted into the oral cavity, etc.).

Two-dimensional image data obtained by the intraoral scanner 500 may be transmitted to a data processing device 100 connected thereto through a wired or wireless communication network.

The data processing device 100 may be any device capable to connecting to the intraoral scanner 500 through a wired or wireless communication network, receiving, from the intraoral scanner 500, two-dimensional image data obtained by scanning an oral cavity, and generating, processing, displaying, and/or transmitting an intraoral image based on the received two-dimensional image data.

Based on the two-dimensional image data received from the intraoral scanner 500, the data processing device 100 may generate at least one of information generated by processing the two-dimensional image data and an intraoral image generated by processing the two-dimensional image data, and display the generated information and intraoral image through a display 130.

The data processing device 100 may be a computing device such as a smart phone, a laptop computer, a desktop computer, a personal digital assistant (PDA), or a tablet personal computer (PC), but is not limited thereto.

In addition, the data processing device 100 may be in the form of a server (or a server device) or the like for processing an intraoral image.

In addition, the intraoral scanner 500 may transmit, to the data processing device 100, raw data obtained through intraoral scanning, as it is. In this case, the data processing device 100 may generate a three-dimensional intraoral image representing the oral cavity in three dimensions, based on the received raw data. In addition, the 'three-dimensional intraoral image' may be generated by modeling the internal structure of the oral cavity in three dimensions based on the received raw data, and thus may be referred to as a 'three-dimensional oral model' or a 'three-dimensional intraoral image'. Hereinafter, a model or an image representing an oral cavity in two dimensions or three dimensions will be collectively referred to as an 'intraoral image'.

In addition, the data processing device 100 may analyze, process, display, and/or transmit the generated intraoral image to an external device.

As another example, the intraoral scanner 500 may obtain raw data through intraoral scanning, process the obtained raw data, generate an image corresponding to the oral cavity that is an object, and transmit the image to the data processing device 100. In this case, the data processing device 100 may analyze, process, display, and/or transmit the received image.

In an embodiment of the disclosure, the data processing device 100 is an electronic device capable of generating and displaying an intraoral image representing an oral cavity including one or more teeth in three dimensions, and will be described in detail below.

Figure 2:
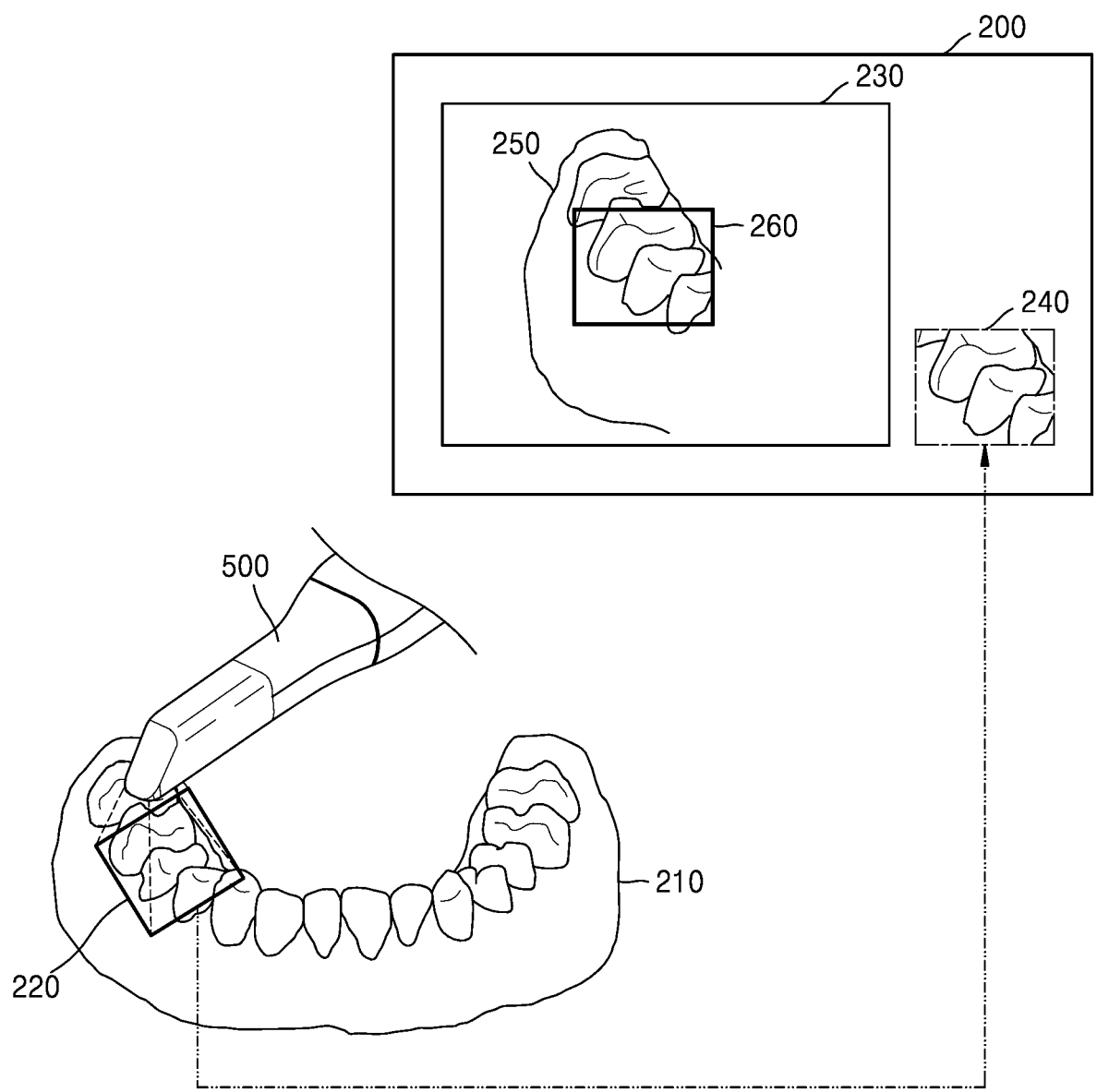
FIG. 2 is a reference diagram for describing a process, performed by a data processing device, of displaying a three-dimensional virtual model generated by using two-dimensional data obtained by an intraoral scanner, according to an embodiment.

FIG. 2 is a reference diagram for describing a process, performed by a data processing device, of displaying a three-dimensional virtual model generated by using two-dimensional data obtained by an intraoral scanner, according to an embodiment.

Referring to FIG. 2, the intraoral scanner 500 projects light into an oral cavity 210 of a patient through a projector, and obtains two-dimensional image data of the oral cavity through one or more cameras. In this case, the intraoral scanner 500 may project light to a scan region of interest (ROI) 220 and obtain two-dimensional image data corresponding to the region 220. Data obtained by the intraoral scanner 500 scanning while moving along the teeth of the oral cavity 210 may be transmitted to the data processing device 100 in real time.

The data processing device 100 may receive the two-dimensional image data corresponding to the scan ROI 220 from the intraoral scanner 500 in real time, and generate a three-dimensional virtual model by matching one or more pieces of received two-dimensional image data with each other. Referring to FIG. 2, the data processing device 100 may display data through two windows, that is, a main window 230 and a sub-window 240 on a display screen 200. For example, the data processing device 100 may display, on the main window 230 (or a first window), an image corresponding to the three-dimensional virtual model generated by the data processing device 100, and display, on the sub-window 240 (or a second window), data corresponding to a scan ROI being currently scanned by the intraoral scanner.

That is, the data processing device 100 may display, on the sub-window 240, the two-dimensional image data corresponding to the scan ROI 220 received from the intraoral scanner 500 in real time, and collect two-dimensional image data corresponding to the scan ROI 220 received in real time from the intraoral scanner 500 to generate a three-dimensional virtual model, and then display, on the main window 230, an image 250 of the generated three-dimensional virtual model. In the image 250 of the three-dimensional virtual model on the main window 230, a box 260 for indicating the scan ROI in the three-dimensional virtual model may be displayed.

Figure 3:
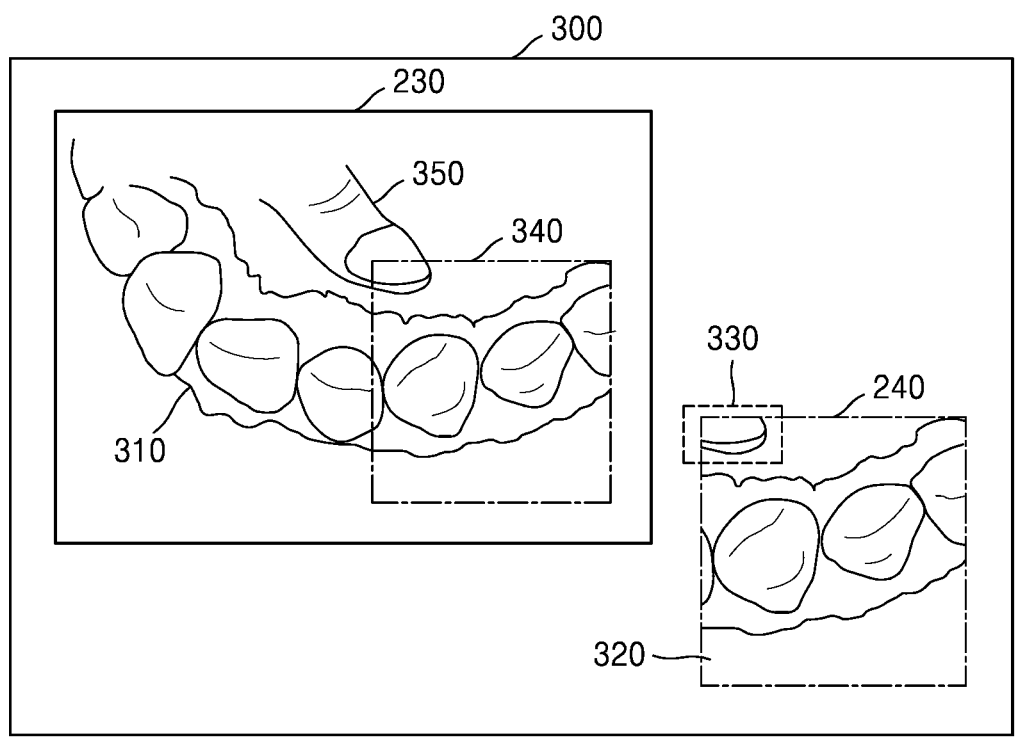
FIG. 3 is a reference diagram for describing a situation in which a foreign object is included in a scan region of interest, according to an example.

FIG. 3 is a reference diagram for describing a situation in which a foreign object is included in a scan ROI, according to an example.

Referring to FIG. 3, two-dimensional image data 320 corresponding to a scan ROI received from the intraoral scanner 500 in real time may be displayed on a sub-window 240 of a screen 300 displayed by a data processing device. Here, as a part of a finger of a user is included in the scan ROI, the two-dimensional image data 320 displayed on the sub-window 240 may include an image 330 of the part of the finger.

In a case in which a part of a finger of a user is included in a scan ROI, the data processing device receives, from the intraoral scanner 500, an image corresponding to the scan ROI including a partial image of the finger, and generates a three-dimensional virtual model based the image, and accordingly, a partial image of the finger may be included in a three-dimensional virtual model generated by the data processing device. Accordingly, referring to FIG. 3, an image 310 of the three-dimensional virtual model is displayed on a main window 230, and a partial image 350 of the finger may be included in the image 310 of the three-dimensional virtual model. In the image 310 of the three-dimensional virtual model on the main window 230, a box 340 for indicating the scan ROI in the three-dimensional virtual model may be displayed.

As described above, in a case in which a foreign object other than an object to be scanned by the intraoral scanner 500 is present in the scan ROI, which is the target for the intraoral scanner 500 to scan the object, the intraoral scanner 500 scans even the foreign object and transmits, to the data processing device, data obtained as a result of the scanning, then, the data processing device generates a three-dimensional virtual model including data corresponding to the foreign object, and accordingly, such a foreign object inevitably becomes an obstacle to the creation of an accurate three-dimensional virtual model. The foreign object refers to any material other than an object in an oral cavity or an oral cast model to be scanned, and may be, for example, a finger of a user, tongue, or various tools for diagnosing or treating the oral cavity.

Embodiments disclosed in the present disclosure provide a method of processing data such that, in a case in which a foreign object is included in a scan ROI from which the intraoral scanner 500 obtains an image, a three-dimensional virtual model may be generated excluding the foreign object.

Embodiments disclosed herein provide a method of processing data such that, in a case in which a predetermined object, such as a dental treatment auxiliary device made of a particular material, is detected from a scan ROI from which the intraoral scanner 500 obtains an image, a three-dimensional virtual model is generated to obtain a more accurate image of the predetermined object.

In addition, the embodiments disclosed herein provide a method of processing data to generate a three-dimensional virtual model considering a situation in which a user wants to further increase the resolution or enlarge an image of a scan ROI from which the intraoral scanner 500 obtains an image.

Figure 4:
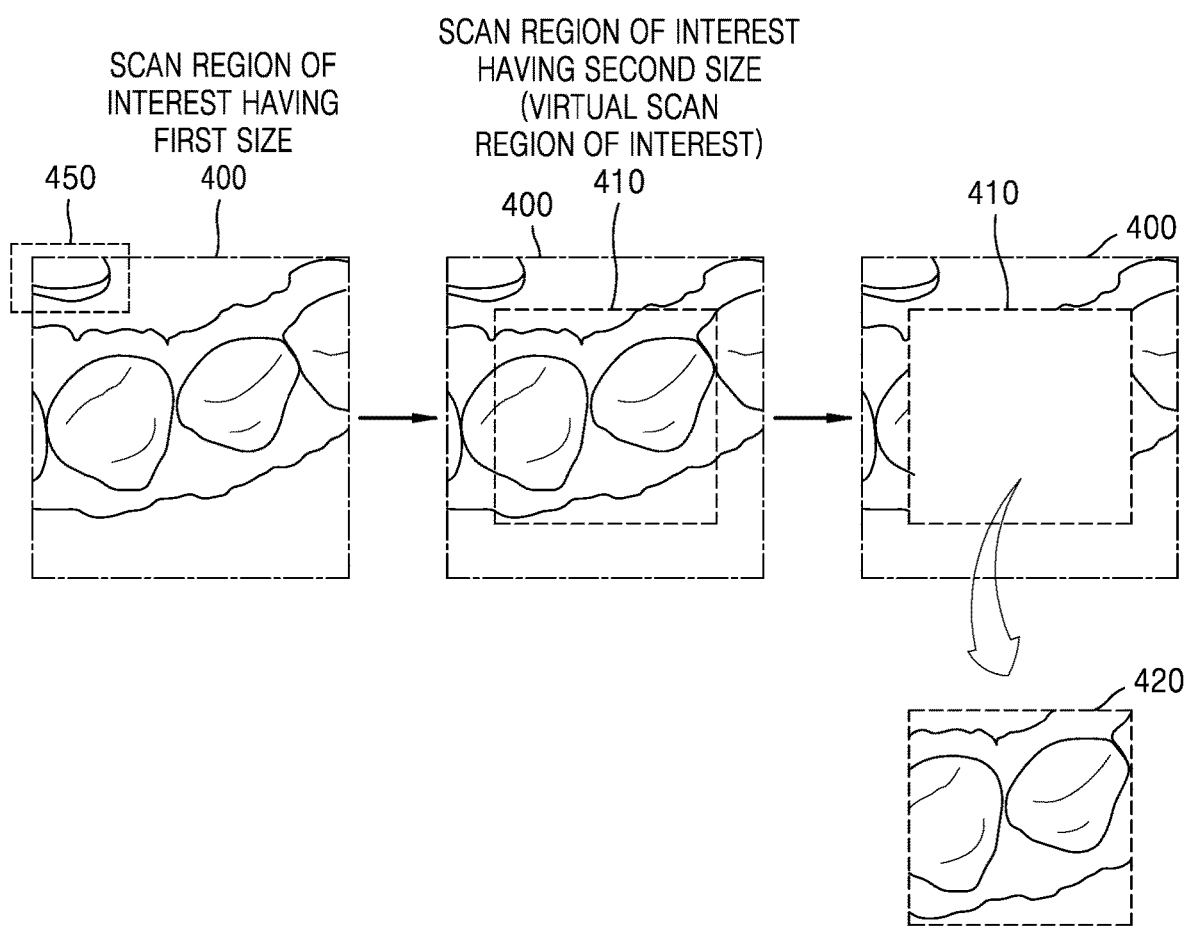
FIG. 4 is a reference diagram for describing a method of adjusting a scan region of interest, according to an embodiment.

FIG. 4 is a reference diagram for describing a method of adjusting a scan ROI, according to an embodiment.

Referring to FIG. 4, an image 400 corresponding to a scan ROI having a first size, which is an image obtained in response to the intraoral scanner 500 projecting light, may include a foreign object 450. The size of the scan ROI is determined by an optical system of the intraoral scanner 500, and when the optical system of the intraoral scanner 500 is not physically adjusted, the size of the scan ROI of the intraoral scanner 500 may be determined to be a default size. In the embodiment, the default size of the scan ROI determined by the optical system of the intraoral scanner 500 may be referred to as the first size.

Here, in a case in which the foreign object 450 is included in the image 400 corresponding to the scan ROI having the default size, it may be desirable to adjust the size of the scan ROI. Adjustment of the size of the scan ROI may be performed by adjusting the optical system of the intraoral scanner 500, but in embodiments of the present disclosure, an operation of adjusting the size of the scan ROI by processing data of an image corresponding to the obtained scan ROI having the default size without adjusting the optical system will be described. That is, the virtual scan ROI 410 having the second size may be set not to include the foreign object 450 in the image 400 corresponding to the obtained scan ROI. Although the actual size of the scan ROI is fixed, the term "virtual scan ROI" may be mentioned in the sense of setting a virtual scan ROI for data processing. Therefore, all scan ROIs other than the scan ROI having the default size and obtained by the physical optical system of the intraoral scanner 500 are set virtually for data processing, and thus may be referred to as virtual scan ROIs. However, in the following description, the virtual scan ROI will be simply referred to as a scan ROI for convenience of description.

Referring to FIG. 4, a three-dimensional virtual model may be generated without the interference of the foreign object 450 by setting the scan ROI 410 having the second size in the image 400 corresponding to the scan ROI having the first size, extracting an image 420 corresponding to the scan ROI 410 having the second size, and using the image 420 to generate the three-dimensional virtual model. Here, the second size may be smaller than the first size.

According to an embodiment, whether to adjust the size of the scan ROI may be determined according to whether a predetermined event is detected. For example, the predetermined event may be performed manually by receiving a user input or automatically based on the data processing device detecting a foreign object. In a case in which the predetermined event is receiving a user input, the user may confirm that a foreign object is included in the scan ROI and input a user input for adjusting the scan ROI to exclude the foreign object. Alternatively, the user may input a user input for adjusting the scan ROI to increase the resolution of the scan ROI or to enlarge the scan ROI even in a case in which no foreign object is included in the scan ROI.

According to an embodiment, an interface for receiving a user input for instructing to adjust the size of the scan ROI may be implemented by a button provided on the intraoral scanner or a graphical user interface of a data device for processing an intraoral image.

According to an embodiment, one or more neural networks may be used to detect a foreign object in an image corresponding to the scan ROI.

According to an embodiment, the data processing operation of adjusting the size of the scan ROI may be performed by the intraoral scanner 500, and the intraoral scanner may transmit, to the data processing device, data obtained by adjusting the size of the scan ROI.

According to an embodiment, the data processing operation of adjusting the size of the scan ROI may be performed by the data processing device.

According to an embodiment, in a case of decreasing the size of the scan ROI, a process of increasing the resolution of the scan ROI may be performed.

Figure 5:
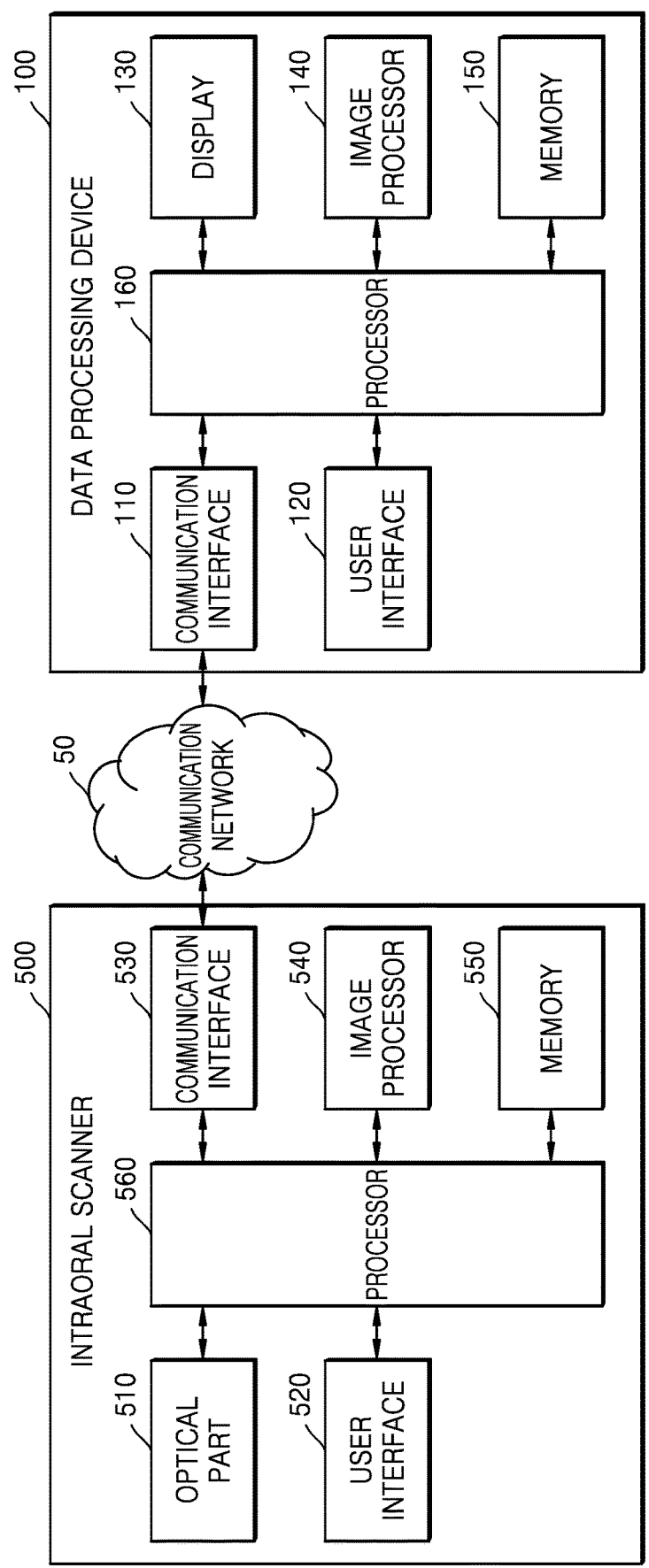
FIG. 5 is an example of a detailed block diagram of a system including an intraoral scanner and a data processing device, according to an embodiment.

FIG. 5 is an example of a detailed block diagram of a system including an intraoral scanner and a data processing device, according to an embodiment.

Referring to FIG. 5, the system may include the intraoral scanner 500, the data processing device 100, and a communication network 50 configured to enable communication between the intraoral scanner 500 and the data processing device 100.

The intraoral scanner 500 may transmit, to the data processing device 100 through the communication network 50, two-dimensional data obtained by scanning the oral cavity of a patient or a dental cast model, and the data processing device 100 may process the two-dimensional data received from the intraoral scanner 500 to generate a three-dimensional virtual model, and display the generated three-dimensional virtual model on a display or transmit the generated three-dimensional virtual model to an external device.

First, the data processing device 100 will be described.

Referring to FIG. 5, the data processing device 100 may include a communication interface 110, a user interface 120, the display 130, an image processor 140, a memory 150, and a processor 160.

The communication interface 110 may perform communication with at least one external electronic device through a wired or wireless communication network. In detail, the communication interface 110 may communicate with the intraoral scanner 500 under control by the processor 160. The communication interface 110 may perform communication with an external electronic device or server connected thereto through a wired/wireless communication network, under control by the processor.

In detail, the communication interface may include at least one short-range communication module configured to perform communication according to a communication standard such as Bluetooth, Wi-Fi, Bluetooth Low Energy (BLE), near-field communication (NFC)/radio frequency identification (RFID), Wi-Fi Direct, ultra-wideband (UWB), or Zigbee.

In addition, the communication interface 110 may further include a long-range communication module configured to communicate with a server for supporting long-range communication according to a long-range communication standard. In detail, the communication interface 110 may include a long-range communication module configured to perform communication through a network for Internet communication. In addition, the communication interface 110 may include a communication module configured to perform communication through a communication network conforming to a mobile communication standard, such as $3^{rd}$ Generation (3G), $4^{th}$ Generation (4G), and/or $5^{th}$ Generation (5G).

In addition, the communication interface 110 may include at least one port for connecting to an external electronic device (e.g., an intraoral scanner, etc.) through a cable in order to communicate with the external electronic device. As such, the communication interface 110 may communicate with an external electronic device connected thereto in a wired manner through the at least one port.

The user interface 120 may receive a user input for controlling the data processing device 100. The user interface 120 may include, but is not limited to, a touch panel for detecting a touch of the user, a button for receiving a push manipulation by the user, and a user input device including a mouse or a keyboard for designating or selecting a point on a user interface screen.

In addition, the user interface 120 may include a speech recognition device for speech recognition. For example, the speech recognition device may be a microphone, and may receive a voice command or a voice request of the user. Accordingly, the processor may control an operation corresponding to the voice command or voice request to be performed.

The display 130 displays a screen. In detail, the display 130 may display a certain screen under control by the processor 160. In detail, the display 130 may display a user interface screen including an intraoral image generated based on data obtained by the intraoral scanner 500 scanning the oral cavity of the user. Alternatively, the display 130 may display a user interface screen including information related to dental treatment for the patient.

The image processor 140 may perform operations for generating and/or processing an image. In detail, the image processor 140 may receive raw data obtained by the intraoral scanner 500 and generate an intraoral image based on the received data. In detail, the image processor 140 may adjust a scan ROI of the scan data received from the intraoral scanner 500 based on a predetermined event being detected, and generate a three-dimensional virtual model based on the adjusted scan ROI.

The memory 150 may store at least one instruction. In addition, the memory 150 may store at least one instruction executable by the processor. Also, the memory may store at least one program executable by the processor 160. Also, the memory 150 may store data (e.g., raw data obtained through intraoral scanning) received from the intraoral scanner. Alternatively, the memory may store an intraoral image representing the oral cavity in three dimensions. According to an embodiment, the memory 150 may include one or more instructions for obtaining final positions of teeth of an intraoral image in an orthodontic plan. According to an embodiment, the memory 150 may include one or more instructions for performing a method disclosed herein for adjusting a scan ROI and generating a three-dimensional virtual model based on the adjusted scan ROI.

The processor 160 executes the at least one instruction stored in the memory 150 to perform control such that an intended operation is performed. Here, the at least one instruction may be stored in an internal memory included in the processor 160 or in the memory 150 included in the data processing device separately from the processor.

In detail, the processor 160 may execute the at least one instruction to control at least one component included in the data processing device such that an intended operation is performed. Therefore, although an example in which the processor performs certain operations is described, it may mean that the processor controls at least one component included in the data processing device to perform the operations.

According to an embodiment, the processor 160 may executes the one or more instructions stored in the memory 150 to display an intraoral image based on a scan ROI having a first size, detect a predetermined event, adjust the size of the scan ROI from the first size to a second size based on the predetermined event being detected, and display an intraoral image based on the scan ROI adjusted to have the second size.

According to an embodiment, the predetermined event may include at least one of receiving a user input for instructing to adjust the size of the scan ROI, detecting a foreign object in the intraoral image, and detecting a predetermined object in the intraoral image.

According to an embodiment, an interface for receiving a user input for instructing to adjust the size of the scan ROI may be implemented by a user interface provided on the intraoral scanner or a graphical user interface of a device processing the intraoral image.

According to an embodiment, the processor 160 may execute the one or more instructions stored in the memory 150 to increase or decrease the size of the scan ROI according to a user input.

According to an embodiment, in a case of decreasing the size of the scan ROI by executing the one or more instructions stored in the memory 150, the processor 160 may increase the resolution of the scan ROI.

According to an embodiment, the processor 160 may execute the one or more instructions stored in the memory 150 to transmit, to the intraoral scanner, a control signal indicating adjustment of the size of the scan ROI from the first size to the second size, in response to the transmission of the control signal, receive, from the intraoral scanner, scan data corresponding to the second size of the scan ROI, and generate an intraoral image corresponding to the scan ROI having the second size, based on the received scan data.

According to an embodiment, the processor 160 may execute the one or more instructions stored in the memory 150 to use one or more neural networks to detect a foreign object in an intraoral image.

According to an embodiment, the predetermined object detected in an intraoral image may include a dental treatment auxiliary device made of a particular material. The particular material may include, for example, a metal material.

According to an example, the processor 160 may be implemented to include at least one internal processor and a memory device (e.g., random-access memory (RAM), read-only memory (ROM), etc.) for storing at least one of programs, instructions, signals, and data to be processed or used by the internal processor.

Also, the processor 160 may include a graphics processing unit for graphics processing on a video. In addition, the processor may be implemented as a system on chip (SoC) in which a core and a graphics processing unit (GPU) are integrated. In addition, the processor may include a single processor core (single-core) or a plurality of processor cores (multi-core). For example, the processor may be dual-core, triple-core, quad-core, hexa-core, octa-core, deca-core, dodeca-core, hexadecimal-core, or the like.

In an embodiment of the disclosure, the processor 160 may generate an intraoral image based on two-dimensional image data received from the intraoral scanner 500.

In detail, under control by the processor 160, the communication interface 110 may receive data obtained by the intraoral scanner 500, for example, raw data obtained through intraoral scanning. In addition, the processor 160 may generate a three-dimensional intraoral image representing an oral cavity in three dimensions, based on the raw data received by the communication interface. For example, the intraoral scanner may include an L camera corresponding to a left field of view and an R camera corresponding to a right field of view, in order to reconstruct a three-dimensional image by performing an optical triangulation method. In addition, the intraoral scanner may obtain L image data corresponding to the left field of view and R image data corresponding to the right field of view, from the L camera and the R camera, respectively. Subsequently, the intraoral scanner (not shown) may transmit raw data including the L image data and the R image data, to the communication interface of the data processing device 100.

Then, the communication interface 110 may transmit the received raw data to the processor, and the processor may generate an intraoral image representing the oral cavity in three dimensions, based on the received raw data.

In addition, the processor 160 may control the communication interface to directly receive an intraoral image representing the oral cavity in three dimensions, from an external server, medical device, or the like. In this case, the processor may obtain a three-dimensional intraoral image without generating a three-dimensional intraoral image based on the raw data.

According to an embodiment of the present disclosure, that the processor 160 perform operations such as 'extraction', 'obtaining', and 'generation' may mean that the processor 160 executes at least one instruction to directly perform the operations, as well as that the processor 160 controls other components such that the operations are performed.

In order to implement the embodiments disclosed herein, the data processing device 100 may include only some of the components illustrated in FIG. 5 or may include more components than the components illustrated in FIG. 5.

In addition, the data processing device 100 may store and execute dedicated software linked to the intraoral scanner. Here, the dedicated software may be referred to as a dedicated program, a dedicated tool, or a dedicated application. In a case in which the data processing device 100 operates in conjunction with the intraoral scanner 500, the dedicated software stored in the data processing device 100 may be connected to the intraoral scanner 500 to receive data obtained through intraoral scanning in real time. For example, Medit's intraoral scanner 'i500' includes dedicated software for processing data obtained through intraoral scanning. In detail, Medit has developed and distributes 'Medit Link' that is software for processing, managing, using, and/or transmitting data obtained by an intraoral scanner, for example, i500. Here, 'dedicated software' refers to a program, a tool, or an application that may operate in conjunction with an intraoral scanner, and thus may be used in common by various intraoral scanners developed and sold by various manufacturers. In addition, the above-described dedicated software may be developed and distributed separately from intraoral scanners for performing intraoral scanning.

The data processing device 100 may store and execute dedicated software corresponding to the product 'i500'. The dedicated software may perform one or more operations of obtaining, processing, storing, and/or transmitting an intraoral image. Here, the dedicated software may be stored in the processor. In addition, the dedicated software may provide a user interface for use of data obtained from the intraoral scanner. Here, a user interface screen provided by the dedicated software may include an intraoral image generated according to an embodiment of the present disclosure.

Hereinafter, the intraoral scanner 500 that transmits, to the data processing device 100, two-dimensional image data obtained by scanning an oral cavity will be described.

Referring to FIG. 5, the intraoral scanner 500 may include an optical part 510, a user interface 520, a communication interface 530, an image processor 540, a memory 550, and a processor 560.

The optical part 510 may include a projector configured to project light from a light source, and one or more cameras. For example, the optical part 510 may include an L camera corresponding to a left field of view and an R camera corresponding to a right field of view, in order to reconstruct a three-dimensional image by performing an optical triangulation method. The L camera and the R camera may obtain L image data corresponding to the left field of view and R image data corresponding to the right field of view, respectively. Raw data including the L image data and the R image data obtained by the optical part 510 may be transmitted to the image processor 540 for data processing.

The user interface 520 may receive a user input for controlling the intraoral scanner 500. The user interface 520 may include a touch panel for detecting a touch of the user, a button for receiving a push manipulation by the user, and a speech recognition device including a microphone.

In particular, according to an embodiment, the user interface 520 may include an input mechanism for adjusting a scan ROI. For example, the input mechanism for adjusting a scan ROI may include a button-type, ring-type, wheel-type, or touch pad-type mechanism.

The communication interface 530 may perform communication with the data processing device 100 through a wired or wireless communication network. In detail, the communication network 510 may communicate with the data processing device 100 under control by the processor 560.

In detail, the communication interface may include at least one short-range communication module configured to perform communication according to a communication standard such as Bluetooth, Wi-Fi, BLE, NFC/RFID, Wi-Fi Direct, UWB, or Zigbee, a long-range communication module configured to communicate with a server for supporting long-range communication according to a long-range communication standard, and at least one port to be connected to an external electronic device through a cable for performing wired communication.

The image processor 540 may perform operations for generating and/or processing an image. In detail, the image processor 540 may image-process two-dimensional image data obtained from the optical part 510. The image processor 540 may perform only a processing operation for data transmission or the like on the two-dimensional image data obtained from the optical part 510, and output a result of the processing operation to the communication interface 530 for transmission to the data processing device.

According to an embodiment, the image processor 540 may adjust a scan ROI based on a predetermined event being detected, generate a three-dimensional virtual model by using two-dimensional image data based on the adjusted scan ROI, and output the generated three-dimensional virtual model to the communication interface 530 for transmission to the data processing device.

According to an embodiment, the image processor 540 may adjust the size of a scan ROI in an image corresponding to the scan ROI obtained by the optical part 510, extract an image corresponding to the scan ROI having the adjusted size, and output the extracted image to the communication interface 530 for transmission to the data processing device.

The memory 550 may store at least one instruction. In addition, the memory 550 may store at least one instruction executable by the processor. Also, the memory may store at least one program executable by the processor 560. In addition, the memory 550 may temporarily store two-dimensional image data received from the optical part 510 to be transmitted to the data processing device 100.

The processor 560 may control at least one component included in the intraoral scanner to perform an intended operation. Therefore, although an example in which the processor performs certain operations is described, it may mean that the processor controls at least one component included in the data processing device to perform the operations.

In order to implement the embodiments disclosed herein, the intraoral scanner 500 may include only some of the components illustrated in FIG. 5 or may include more components than the components illustrated in FIG. 5.

Figure 6:
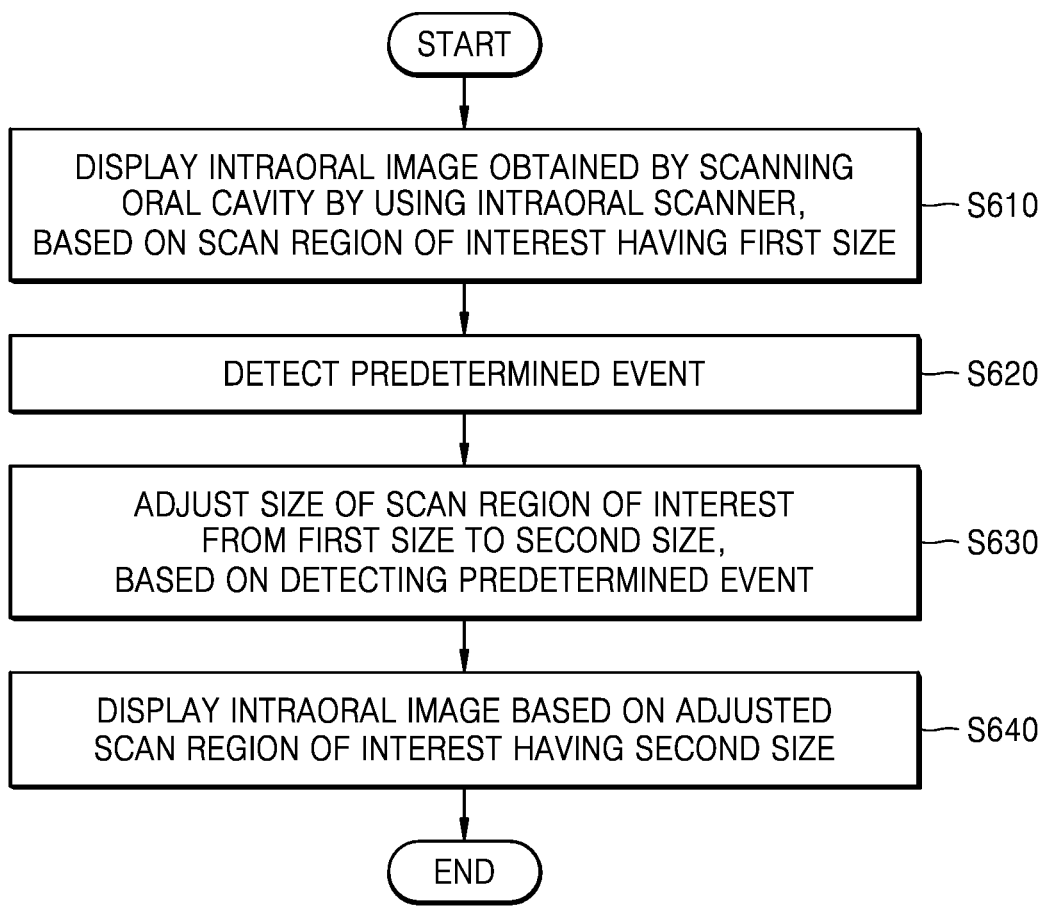
FIG. 6 is a flowchart illustrating an example of a method of processing an intraoral image, according to an embodiment.

FIG. 6 is a flowchart illustrating an example of a method of processing an intraoral image, according to an embodiment.

Referring to FIG. 6, in operation 610, the data processing device 100 may display an intraoral image obtained by scanning an oral cavity by using an intraoral scanner, based on a scan ROI having a first size.

According to an embodiment, the data processing device 100 may receive, from the intraoral scanner 500, two-dimensional image data obtained by scanning the scan ROI having the first size in real time, and generate a three-dimensional virtual model based on the received two-dimensional image data. In addition, the data processing device 100 may display, on a display, an intraoral image corresponding to the generated three-dimensional virtual model. Here, the scan ROI having the first size may be a scan ROI having a default size set by the optical part of the intraoral scanner 500.

In operation 620, the data processing device 100 may detect a predetermined event.

According to an embodiment, the predetermined event may include a user input for instructing to adjust the scan ROI. The user may discover that a default scan ROI includes a foreign object and then input a user input for instructing to adjust the scan ROI, or may input a user input for instructing to adjust the scan ROI to increase the resolution of the scan ROI even in a case in which no foreign object is included in the default scan ROI.

According to an embodiment, the user input for instructing to adjust the scan ROI may be received through various user input interfaces of the data processing device 100. For example, the user input for instructing to adjust the scan ROI may be received through a graphical user interface.

According to an embodiment, the user input for instructing to adjust the scan ROI may be received through various user input interfaces of the intraoral scanner 500. For example, the intraoral scanner 500 may receive the user input for instructing to adjust the scan ROI, through an input unit such as a button-type input unit or a ring or wheel for receiving a rotational input. Based on receiving the user input for instructing to adjust the scan ROI, the intraoral scanner 500 may transmit, to the data processing device 100, a control signal corresponding to the user input for instructing to adjust the scan ROI, to notify the data processing device 100 that the user input for instructing to adjust the scan ROI has been received.

According to an embodiment, the predetermined event may include an event indicating that a foreign object has been detected in the scan ROI.

For example, the data processing device 100 may detect whether a foreign object is included in the scan ROI by using one or more neural networks, and based on detecting a foreign object in the scan ROI, generate an event indicating that the foreign object has been detected in the scan ROI.

According to an embodiment, the predetermined event may include an event indicating that a predetermined object has been detected in the scan ROI.

For example, the data processing device 100 may detect whether the predetermined object is included in the scan ROI by using one or more neural networks, and based on detecting the predetermined object in the scan ROI, generate an event indicating that the predetermined object has been detected in the scan ROI.

The predetermined object may include a dental treatment auxiliary device made of a particular material. The particular material may be, for example, a metal material. For example, the predetermined object may include an artificial structure inserted into the oral cavity. The artificial structure may include dental fillings such as inlays or onlays, crowns, prosthetic aids such as scanbodies or abutments, orthodontic devices, and the like.

In operation 630, the data processing device 100 may adjust the size of the scan ROI from the first size to a second size, based on detecting the predetermined event.

According to an embodiment, the data processing device 100 may set a scan ROI having the second size in the image corresponding to the scan ROI having the first size received from the intraoral scanner 100, and adjust the size of the scan ROI from the first size to the second size by extracting an image corresponding to the scan ROI having the second size.

In operation 640, the data processing device 100 may display an intraoral image based on the adjusted scan ROI having the second size.

According to an embodiment, the data processing device 100 may generate a three-dimensional virtual model based on the image corresponding to the scan ROI having the second size extracted in operation 630, and display, on the display, an intraoral image corresponding to the generated three-dimensional virtual model.

FIG. 7 is a reference diagram for describing an operation of generating a three-dimensional virtual model image by adjusting the size of a scan ROI, according to an embodiment.

Referring to FIG. 7, the data processing device may generate a three-dimensional virtual model based on a scan ROI having a first size, which is a default scan ROI of the intraoral scanner, and display an intraoral image 710 corresponding to the generated three-dimensional virtual model.

In this case, in a case in which a predetermined event occurs, for example, in a case in which a foreign object 720 is detected in the generated three-dimensional virtual model, an operation of adjusting the size of a scan ROI 730 having the first size may be performed. The predetermined event may be receiving, from the user having checked a displayed intraoral image 710, a user input for excluding the foreign object 720. The predetermined event may include the data processing device automatically analyzing the scan ROI in real time to determine whether a foreign object is detected in the scan ROI, and generating an event indicating that a foreign object has been detected.

The data processing device may set a scan ROI 750 having the second size not to include a part 740 of the foreign object in a scan ROI 730 having the first size. The second size of the scan ROI 750 may be set manually by the user or automatically by the data processing device. For example, in a case in which the predetermined event is a user input, the user may set the size of the scan ROI. In a case in which the predetermined event is an event indicating that the data processing device has detected a foreign object in the scan ROI, the data processing device may set the size of the scan ROI.

The data processing device may extract an image 760 corresponding to the scan ROI 750 having the second size, generate a three-dimensional virtual model by using the extracted image 760, and display the intraoral image 720 corresponding to a three-dimensional virtual model generated based on the scan ROI having the second size as described above. Because generation of such a three-dimensional virtual model is performed in real time based on data received from the intraoral scanner, in order to remove an image of the foreign object 720 already generated before adjusting the size of the scan ROI, the intraoral scanner 500 may rescan the corresponding part, and the data processing device may generate a three-dimensional virtual model by applying a scan ROI having the second size based on data obtained as a result of the rescanning, thereby excluding the foreign object 720.

Figure 8:
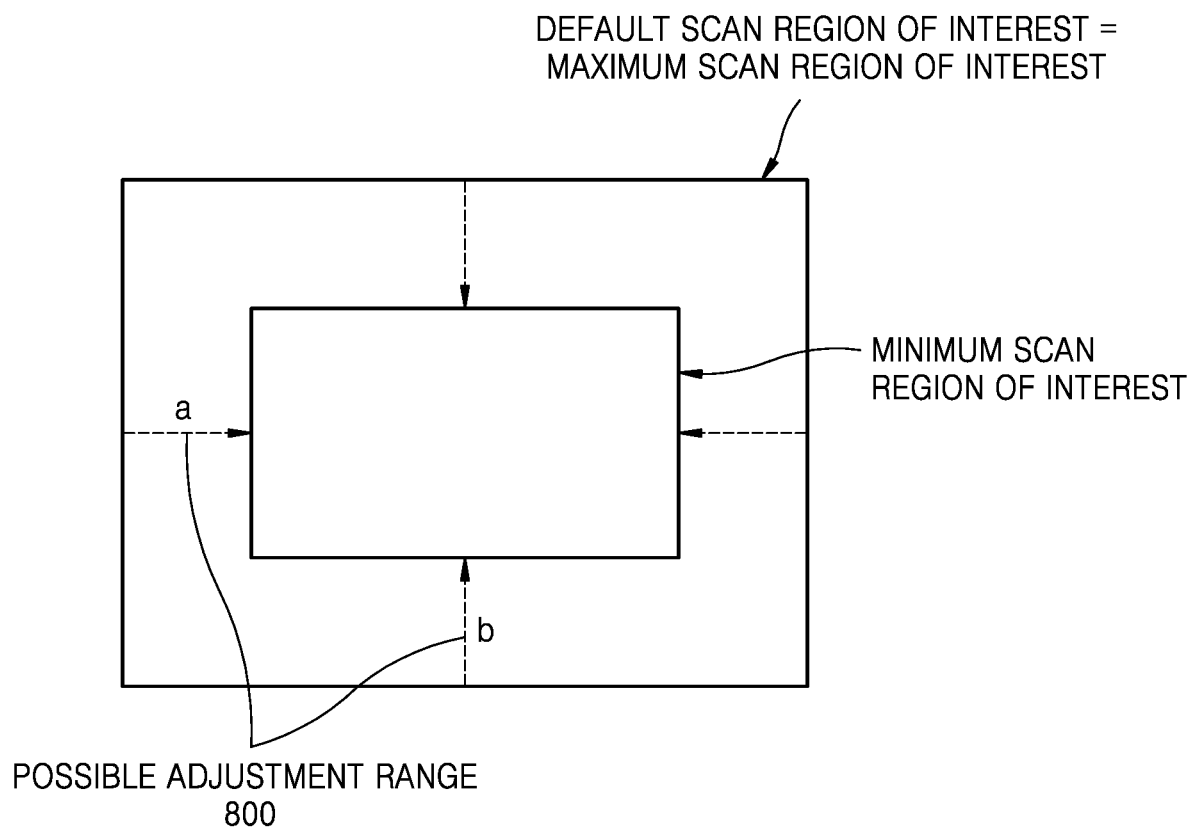
FIG. 8 is a reference diagram for describing a range within which the size of a scan region of interest is adjustable, according to an embodiment.

FIG. 8 is a reference diagram for describing a range within which the size of a scan ROI is adjustable, according to an embodiment.

Referring to FIG. 8, a default scan ROI set in the intraoral scanner may be the maximum scan ROI. In a case in which a foreign object is included in the default scan ROI, the data processing device may adjust the size of the scan ROI to exclude the foreign object. For example, the data processing device may reduce the scan ROI to a minimum scan ROI. In this case, the range within which the scan ROI is adjustable may be represented by a possible adjustment range 800. A possible horizontal adjustment range a and a possible vertical adjustment range b may be equal to or different from each other. When the data processing device generates a three-dimensional virtual model by using data obtained by the intraoral scanner performing scanning, the three-dimensional virtual model is generated by receiving scan data corresponding to the size of the scan ROI in real time and concatenating the received data, and the data processing device cannot generate a three-dimensional virtual model unless a sufficient amount of data to concatenate the data is provided. Thus, a minimum scan ROI may be set to a size that satisfies the minimum amount of data required by the data processing device to generate a three-dimensional virtual model.

According to an embodiment, the data processing device may determine an amount of adjustment of the scan ROI according to a user input. For example, the intraoral scanner may receive an amount of adjustment of the scan ROI through an input unit such as a button or a wheel, and transmit information about the received adjustment amount to the data processing device, such that the data processing device adjusts the scan ROI based on the received information about the adjustment amount. For example, the data processing device may receive a user input regarding the amount of adjustment of the scan ROI through a graphical user interface.

According to an embodiment, the data processing device may automatically determine the amount of adjustment of the scan ROI without a user input. For example, the data processing device may adjust the size of the scan ROI within a range in which a foreign object is not included in the image corresponding to the scan ROI.

Figure 9:
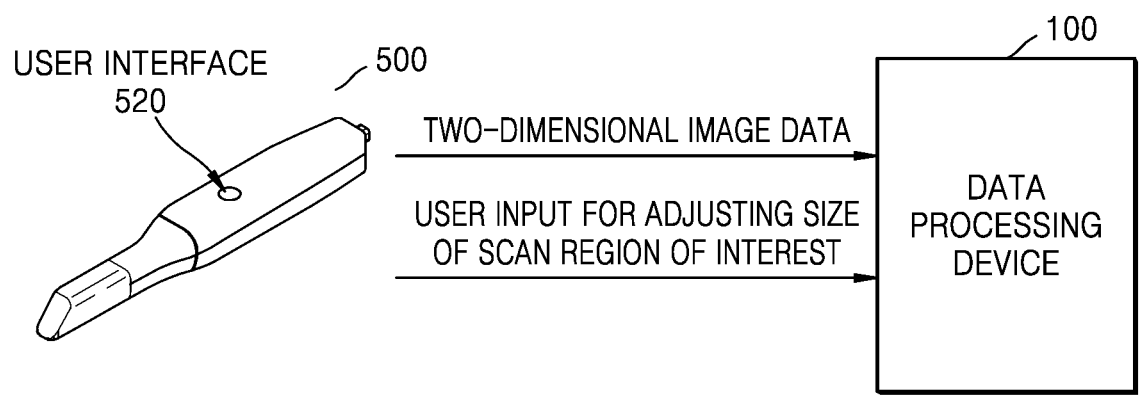
FIG. 9 is a reference diagram for describing an example of receiving a user input for instructing to adjust a scan region of interest, through an intraoral scanner, according to an embodiment.

FIG. 9 is a reference diagram for describing an example of receiving a user input for instructing to adjust a scan ROI, through an intraoral scanner, according to an embodiment.

Referring to FIG. 9, the intraoral scanner 500 may transmit, to the data processing device 100, two-dimensional image data obtained by scanning the oral cavity of a patient.

In addition, in a case in which a foreign object or the like is included in the scan ROI, the intraoral scanner 500 may receive, from the user, a user input for instructing to adjust the scan ROI. The intraoral scanner 500 may include the user interface 520 for receiving such a user input for instructing to adjust the scan ROI.

According to an embodiment, the user interface 520 may receive a user input for instructing to adjust the scan ROI.

The user interface 520 may have various modalities for receiving a user input for instructing to adjust the scan ROI. For example, the user interface 520 may have the form of a keypad, a button, a touch pad, a touch screen, a 4-way button or a 4-way key, a scroll key or a jog dial, or a rotational wheel or a rotational ring. In a case in which the user interface 520 includes a hard key button, the user may input a user command to adjust the scan ROI, by performing a push manipulation on the hard key button. In a case in which the user interface 520 includes a touch screen, the user may input a user command to adjust the scan ROI, by touching a soft key on the touch screen or by dragging. In a case in which the user interface includes a rotational wheel, the user may input a user command to adjust the scan ROI, by rotating the rotational wheel. In addition, the amount of adjustment of the scan ROI may be input according to the duration of pressing a button, the length of a drag, or the amount of rotation of a wheel.

The intraoral scanner 500 may transmit, to the data processing device 100, the user input for instructing to adjust the size of the scan ROI. In addition, the intraoral scanner 500 may transmit, to the data processing device 100, information indicating the amount of adjustment of the size of the scan ROI.

Based on receiving the user input for instructing to adjust the size of the scan ROI and the information about the adjustment amount, the data processing device may adjust the size of the scan ROI by using the received information, and generate a three-dimensional virtual model based on the scan ROI having the adjusted size.

Figure 10:
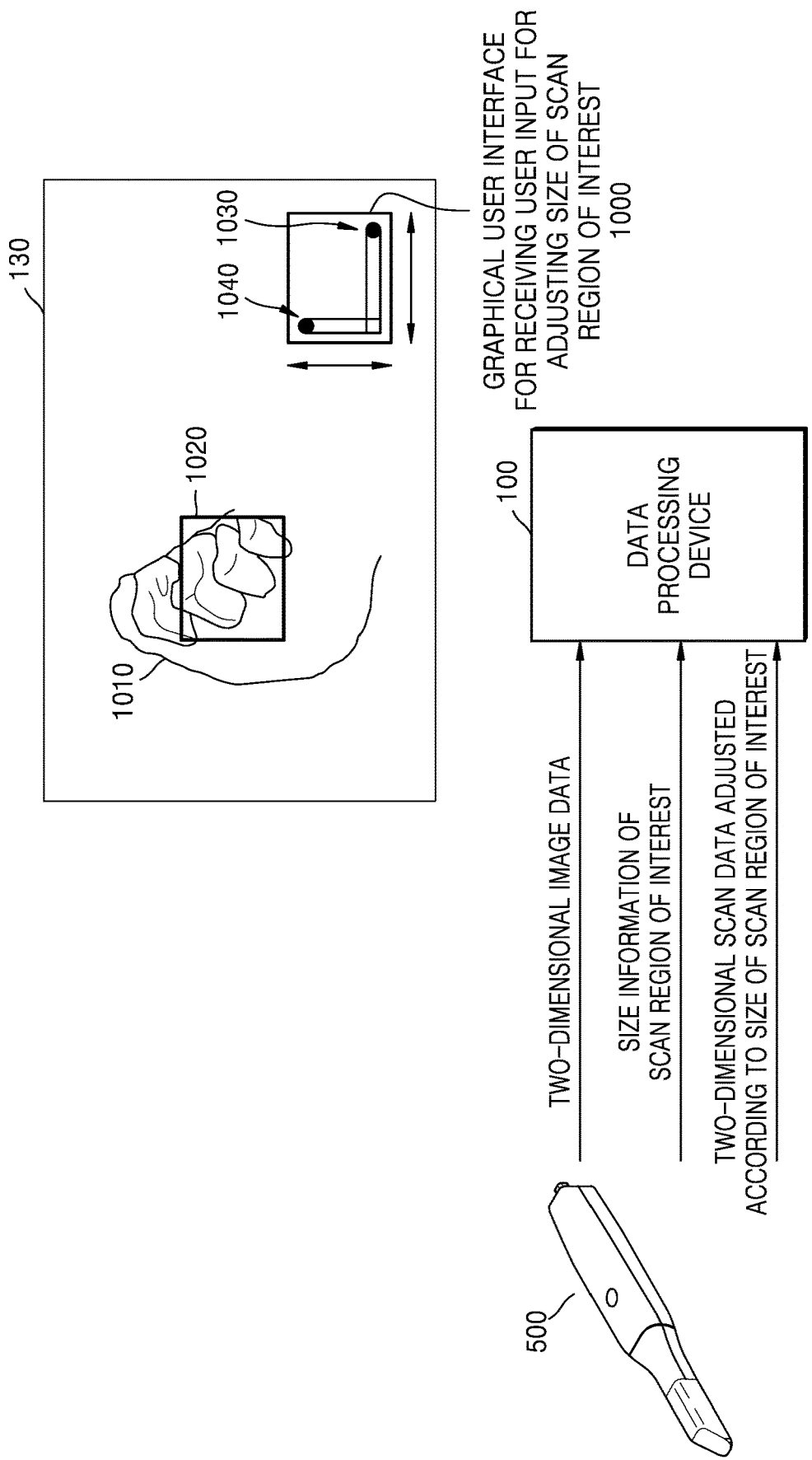
FIG. 10 is a reference diagram for describing an example of receiving a user input for instructing to adjust a scan region of interest, through a graphical user interface of a data processing device, according to an embodiment.

FIG. 10 is a reference diagram for describing an example of receiving a user input for instructing to adjust a scan ROI, through a graphical user interface of a data processing device, according to an embodiment.

Referring to FIG. 10, the intraoral scanner 500 may transmit, to the data processing device 100, two-dimensional image data obtained by scanning the oral cavity of a patient.

The data processing device 100 may generate a three-dimensional virtual model based on the two-dimensional image data received from the intraoral scanner 500, and display, on the display 130, an intraoral image 1010 corresponding to the generated three-dimensional virtual model. The data processing device 100 may also display, on the intraoral image 1010, a box 1020 indicating a scan ROI.

According to an embodiment, the data processing device 100 may display a graphical user interface 1000 for receiving a user input for adjusting the size of the scan ROI. In response to the graphical user interface 1000 displayed as described above, the user may input a user command to adjust the size of the scan ROI, through a remote control device, a touch input, or the like. For example, the user may adjust the size of the scan ROI by moving at least one of a first indicator 1030 and a second indicator 1040 included in the graphical user interface 1000 on respective bars, through a remote control device such as a mouse or a drag input. The first indicator 1030 and the second indicator 1040 positioned at their maximum values indicate that the maximum scan ROI is set, and as the first indicator 1030 moves leftward and the second indicator 1040 moves downward, the size of the scan ROI may be decreased.

The data processing device 100 may determine the size of the scan ROI based on the positions of the first indicator 1030 and the second indicator 1040 received through the graphical user interface 1000, and generate a three-dimensional virtual model based on two-dimensional image data received from the intraoral scanner 500, based on the determined size of the scan ROI.

The graphical user interface 1000 including the first indicator 1030 and the second indicator 1040 as illustrated in FIG. 10 is only an example, and the graphical user interface for receiving a user input for adjusting the size of a scan ROI may be implemented in various ways.

Figure 11:
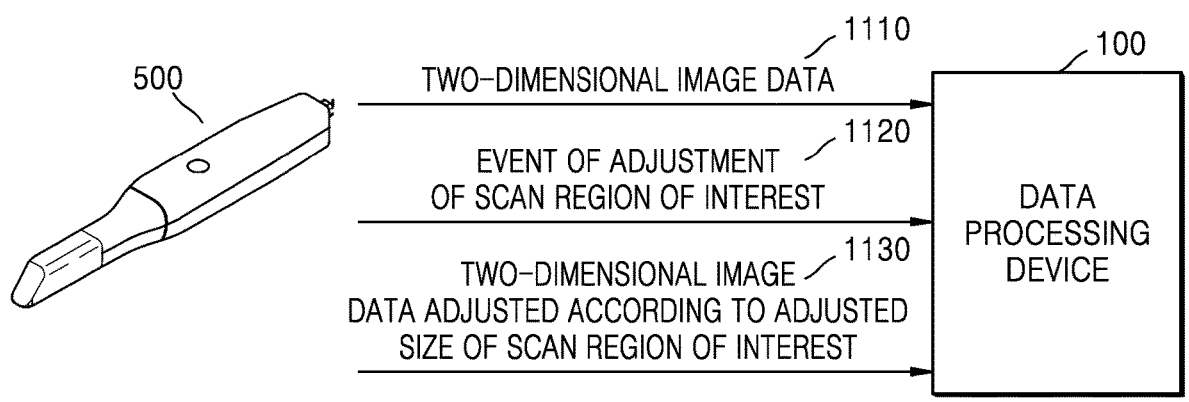
FIG. 11 is a reference diagram for describing an example of transmitting two-dimensional image data adjusted according to the size of a scan region of interest adjusted by an intraoral scanner, according to an embodiment.

FIG. 11 is a reference diagram for describing an example of transmitting two-dimensional image data adjusted according to the size of a scan ROI adjusted by the intraoral scanner 500, according to an embodiment.

In order to adjust the size of a scan ROI according to an embodiment, the intraoral scanner 500 may transmit, to the data processing device 100, two-dimensional image data corresponding to a default scan ROI before adjustment, and the data processing device 100 may generate a three-dimensional virtual model by extracting an image corresponding to a scan ROI having an adjusted size, from an image corresponding to the default scan ROI.

According to another embodiment, the amount of data transmitted from the intraoral scanner 500 to the data processing device 100 may be reduced by the intraoral scanner 500 adjusting the two-dimensional image data to adjust the size of the scan ROI and transmitting the adjusted two-dimensional image data to the data processing device 100.

Referring to FIG. 11, the intraoral scanner 500 may obtain two-dimensional image data 1110 corresponding to the default scan ROI, and obtain an event 1120 indicating that the size of the scan ROI is adjusted, while transmitting the two-dimensional image data 1110 to the data processing device 100. The event indicating that the size of the scan ROI is adjusted may include information about the adjusted size of the scan ROI.

The intraoral scanner 500 may receive the information about the adjusted size of the scan ROI through the user interface 520 of the intraoral scanner 500 or from the data processing device 100.

Based on receiving the event 1120 indicating adjustment of the scan ROI, the intraoral scanner 500 may extract, from an image corresponding to the default scan ROI, an image corresponding to the scan ROI having the adjusted size, and transmit, to the data processing device, two-dimensional image data 1130 corresponding to the extracted scan ROI having the adjusted size. As described above, the amount of data transmitted from the intraoral scanner 500 to the data processing device 100 may be reduced by the intraoral scanner 500 extracting and transmitting only the image corresponding to the scan ROI having the adjusted size, rather than transmitting entire two-dimensional image data obtained by the optical unit.

Figure 12:
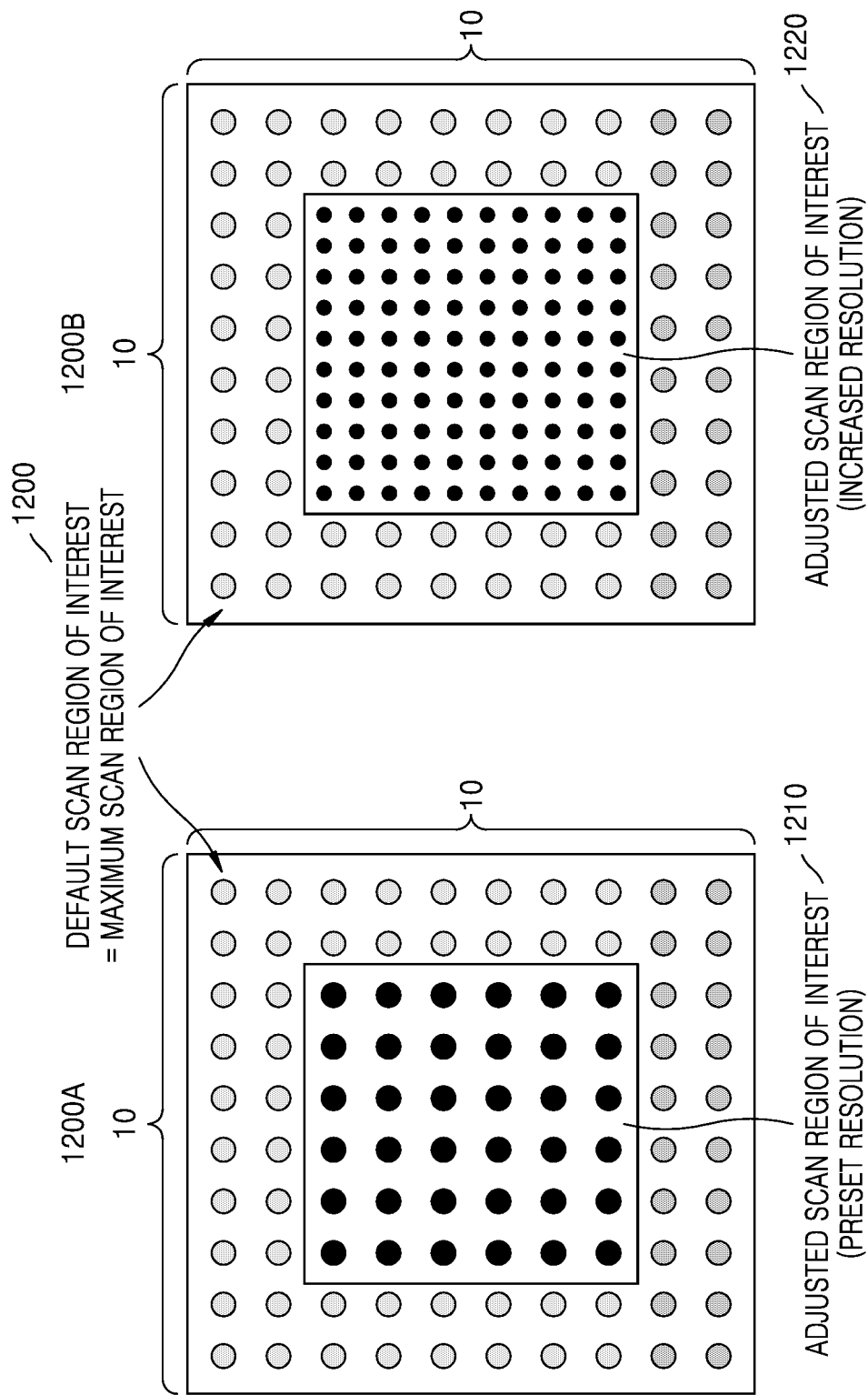
FIG. 12 is a reference diagram for describing processing of a resolution of an adjusted scan region of interest in a case in which the size of the scan region of interest is adjusted, according to an embodiment.

FIG. 12 is a reference diagram for describing processing of a resolution of an adjusted scan ROI in a case in which the size of the scan ROI is adjusted, according to an embodiment.

Referring to 1200A of FIG. 12, the size of a default scan ROI 1200 is 10×10 and may include 100 points. However, in practice, for example, four values may be extracted from the 100 points, and thus, the data processing device may extract and use 400 values from the default scan ROI 1200, but may actually extract and use only 100 values for a three-dimensional virtual model.

In this case, in a case in which the size of the scan ROI is adjusted to 6×6, and the data processing device processes data while maintaining the resolution to be constant without separate resolution improvement, the data processing device may extract 36 values from a 6×6 region and uses them for the three-dimensional virtual model.

Referring to 1200B of FIG. 12, in a case in which the size of the scan ROI is adjusted to 6×6, the data processing device may extract 100 values again from the adjusted 6×6 scan ROI and uses them for data processing to improve the resolution.

The data processing device may adjust the scan ROI based on a user input, and may also automatically adjust the scan ROI based on detecting a foreign object in the scan ROI.

Such detection of a foreign object in the scan ROI may be performed through various algorithms. Hereinafter, an embodiment in which a neural network is used to detect a foreign object in a scan ROI will be described.

Figure 13:
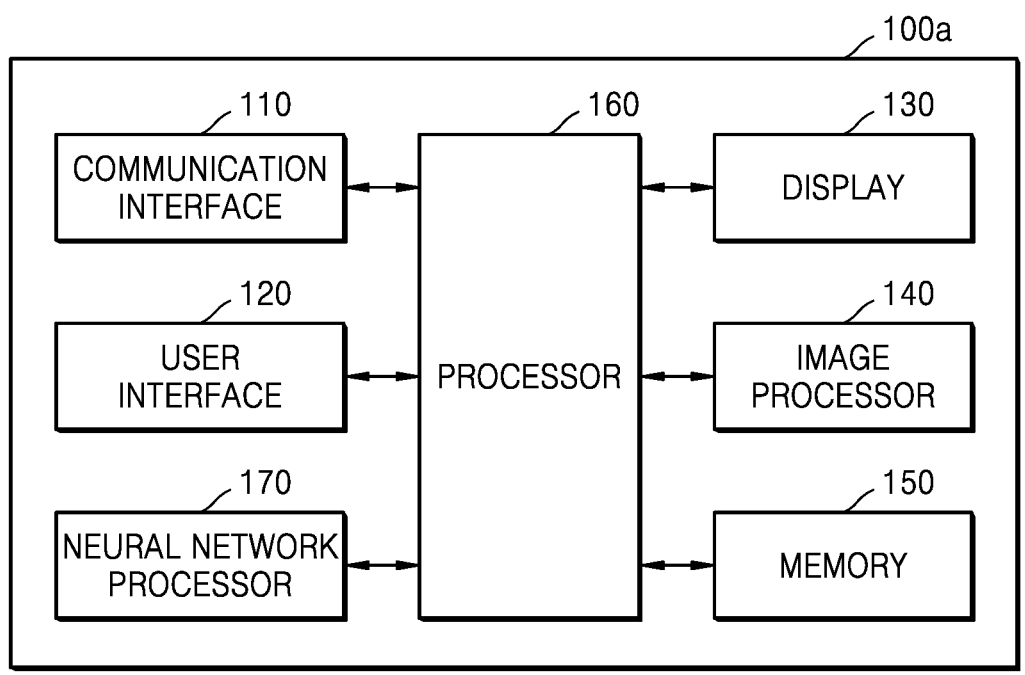
FIG. 13 is a block diagram of a data processing device that adjusts the size of a scan region of interest based on detecting a foreign object in the scan region of interest, according to an embodiment.

FIG. 13 is a block diagram of a data processing device that adjusts the size of a scan ROI based on detecting a foreign object in the scan ROI, according to an embodiment.

Referring to FIG. 13, a data processing device 100a may further include a neural network processor 170, in addition to the communication interface 110, the user interface 120, the display 130, the image processor 140, the memory 150, and the processor 160. Descriptions of the communication interface 110, the user interface 120, the display 130, the image processor 140, the memory 150, and the processor 160 are the same as those provided above with reference to FIG. 5, and thus will be omitted.

The neural network processor 170 may determine, by using one or more neural networks, whether a foreign object is detected in an image corresponding to a scan ROI received in real time from the intraoral scanner 500, and based on determining that a foreign object has been detected, transmit, to the image processor 140, an event indicating that the foreign object has been detected in the scan ROI and information about a position at which the foreign object has been is detected in the scan ROI, such that they are used for adjustment of the scan ROI.

The neural network processor 170 is a dedicated artificial intelligence processor, and may be controlled to process input data according to an artificial intelligence model. The neural network processor 170 may be controlled to process input data according to a predefined operation rule or an artificial intelligence model stored in a memory, or may be designed as a hardware structure specialized for processing a particular artificial intelligence model.

The predefined operation rule or the artificial intelligence model may be generated through a training process, and being generated through a training process may mean that the predefined operation rule or the artificial intelligence model set to perform desired characteristics (or purposes) is generated by training a basic artificial intelligence model by using a learning algorithm that utilizes a large amount of training data. The training process may be performed by a device itself on which artificial intelligence according to the present disclosure is performed, or by a separate server and/or system.

Figure 14:
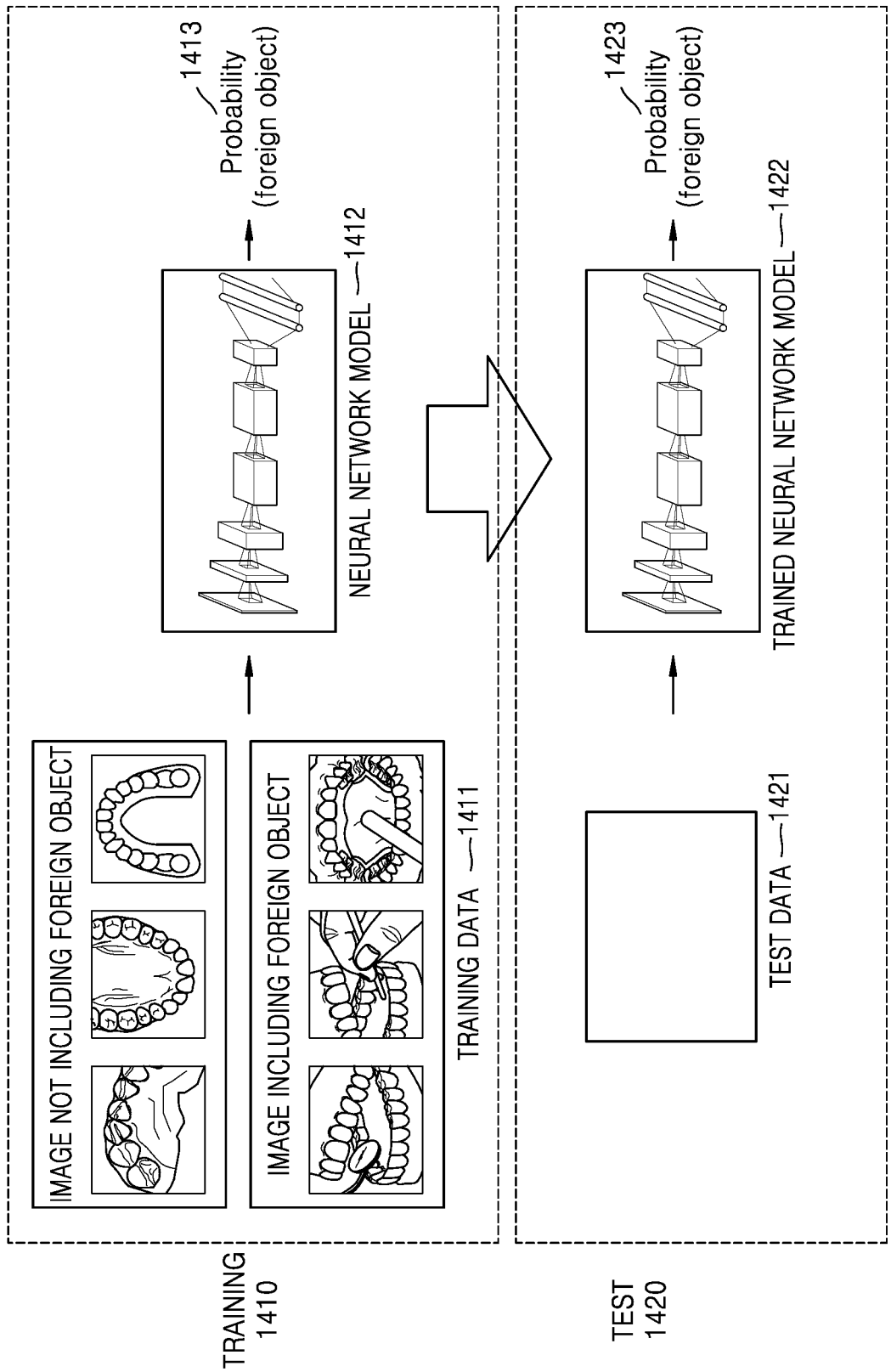
FIG. 14 is a reference diagram for describing a neural network model configured to detect a foreign object in an intraoral image, according to an embodiment.

FIG. 14 is a reference diagram for describing a neural network model configured to detect a foreign object in an intraoral image, according to an embodiment.

Referring to FIG. 14, a process of detecting a foreign object in an intraoral image by using artificial intelligence may be largely divided into two processes.

First, in a training process 1410, a neural network model 1412 may be trained by using a plurality of pieces of training data 1411 as inputs. A probability 1413 of a foreign object being included, which is a result of each training session, may be fed back to the neural network model to be used to update weight values of the neural network model.

In more detail, the training data 1411 includes a plurality of intraoral images, which may include a plurality of intraoral images that do not include a foreign object and a plurality of intraoral images that include foreign objects.

The neural network model 1412 may include a plurality of neural network layers. Each of the neural network layers may include a plurality of weight values, and may perform a neural network arithmetic operation via an arithmetic operation between an arithmetic operation result of a previous layer and the plurality of weight values. A plurality of weight values in each of the neural network layers may be optimized by a result of training the artificial intelligence model. For example, the plurality of weight values may be refined to reduce or minimize a loss or cost value obtained by the artificial intelligence model during the training process. The artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks (DQN), or the like, but is not limited thereto.

Each training result 1413 indicates a probability that an input intraoral image includes a foreign object, and this probability result may be used to update the weight values of the neural network model. When the neural network model 1412 has been trained such that the training result 1413 exceeds a certain level of reliability, this model may be used as a trained neural network model 1422 in a test process.

In a test process 1420, data to be tested 1421, for example, two-dimensional image data corresponding to a scan ROI received in real time may be input to the trained neural network model 1422 to obtain, as a result, a probability value 1423 indicating whether the input two-dimensional image data includes a foreign object.

According to an embodiment, in a case in which a predetermined object has been detected in an oral cavity, a scan ROI may be adjusted to increase the resolution of an image of the detected predetermined object. The embodiment described above with reference to FIG. 3 is for adjusting the scan ROI to exclude a foreign object from the scan region in a case in which the foreign object that is not an object to be scanned has been detected. On the other hand, in an embodiment to be described with reference to FIGS. 15 to 18, the predetermined object to be detected refers to a particular object to be scanned, not a foreign object. A scan ROI may be adjusted to obtain a more accurate image of such a particular object.

Figure 15:
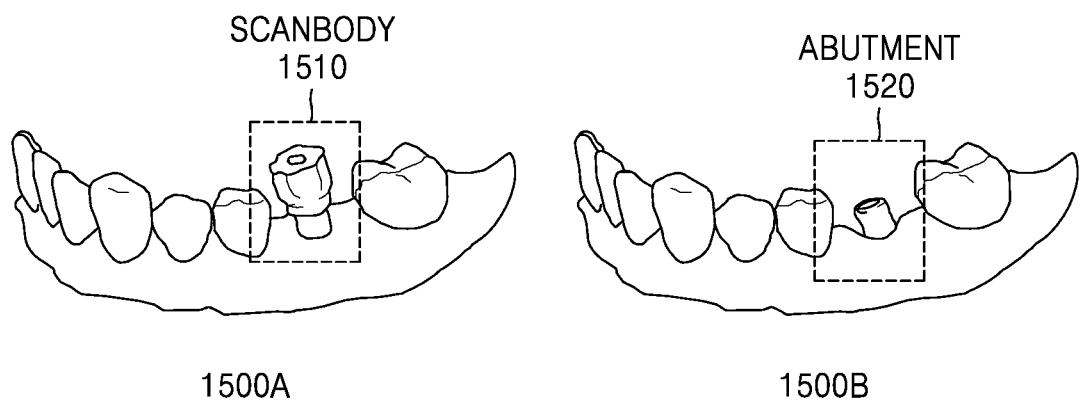
FIG. 15 illustrates examples of artificial structures inserted into an oral cavity, according to an embodiment.

FIG. 15 illustrates examples of artificial structures inserted into an oral cavity, according to an embodiment.

In order to obtain good results in dental treatment using computer-aided design (CAD) and computer-aided manufacturing (CAM), it is necessary to obtain three-dimensional data that accurately reflects the shape of an object. In addition to teeth and gingiva, an oral cavity to be scanned by the intraoral scanner may include an artificial structure inserted into the oral cavity for orthodontic or prosthetic treatment. The artificial structure may include dental fillings such as inlays or onlays, crowns, prosthetic aids such as scanbodies or abutments, orthodontic devices, and the like. Such intraoral artificial structures are often made of a metal material, but an artificial structure made of a metal material has a problem in that it is difficult to obtain an accurate shape by an intraoral scanner performing scanning, due to high reflectance of light.

Referring to 1500A of FIG. 15, a scanbody 1510 is a tool for displaying the position of an implant fixture on a computer screen during CAD work for an implant prosthesis, and for example, a scanbody may be installed in an oral cavity to obtain three-dimensional data through oral scanning. Referring to 1500B of FIG. 15, an implant abutment 1520 refers to a pillar connecting an implant to a crown. Dental medical device manufacturers offer a variety of scanbodies and abutments as off-the-shelf products.

Figure 16:
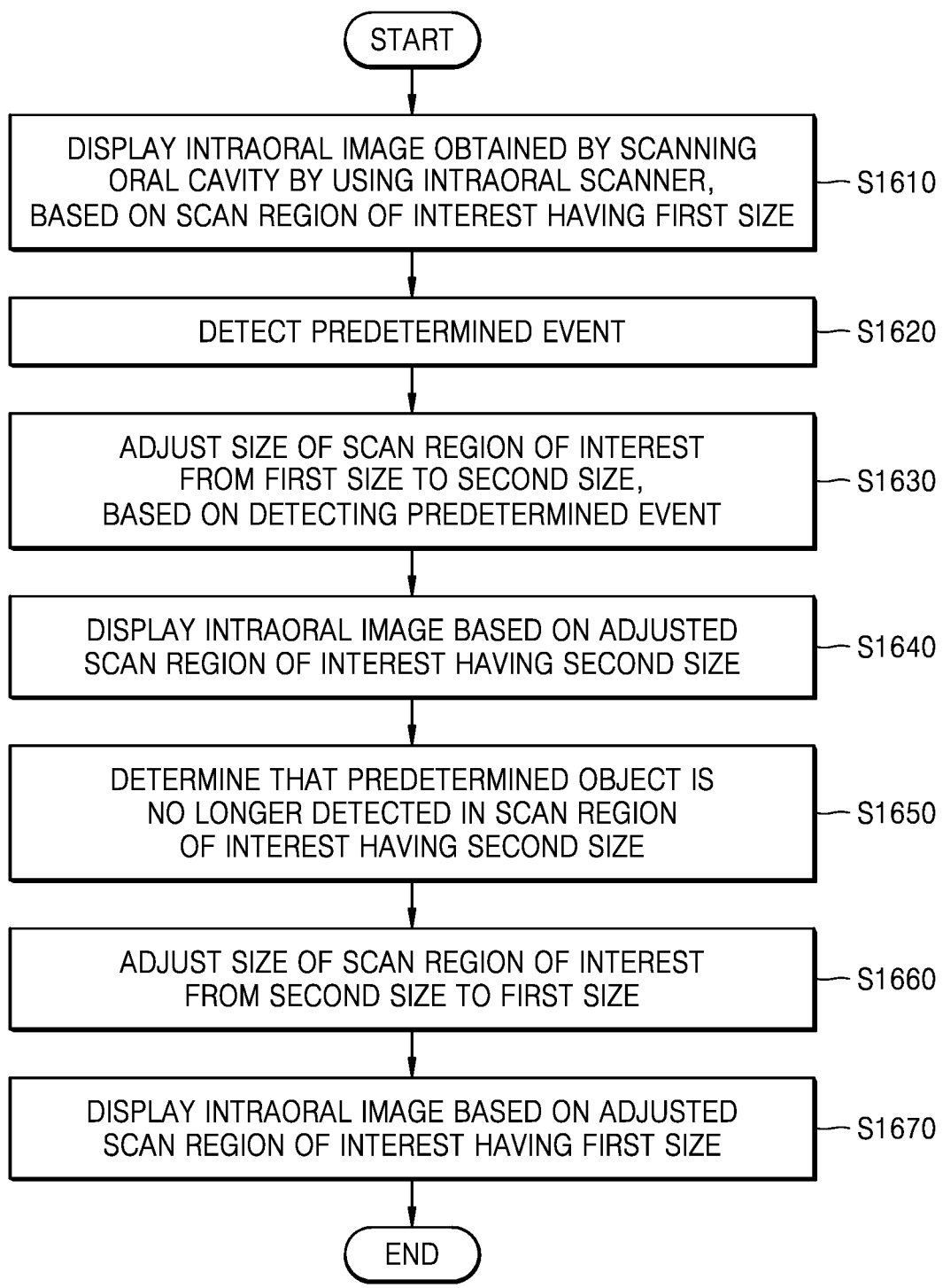
FIG. 16 is a flowchart illustrating an example of a method of processing an intraoral image, according to an embodiment.

FIG. 16 is a flowchart illustrating an example of a method of processing an intraoral image, according to an embodiment.

Referring to FIG. 6, in operation 1610, the electronic device 100 may display an intraoral image obtained by scanning an oral cavity by using an intraoral scanner, based on a scan ROI having a first size.

In operation 1620, the electronic device 100 may detect a predetermined object in the scan ROI having the first size. For example, the predetermined object may include an artificial structure inserted into the oral cavity. The artificial structure may include dental fillings such as inlays or onlays, crowns, prosthetic aids such as scanbodies or abutments, orthodontic devices, and the like.

According to an embodiment, the electronic device 100 may detect the predetermined object in the scan ROI having the first size, by using an artificial intelligence algorithm.

According to an embodiment, the electronic device 100 may detect the predetermined object by using the artificial intelligence algorithm for detecting an artificial structure from input data by learning the shapes of artificial structures such as crowns, scanbodies, or abutments.

According to an embodiment, the electronic device 100 may detect the predetermined object made of a metal material by using the artificial intelligence algorithm for detecting a metal material from input data by learning metal parts in intraoral images.

In operation 1630, the electronic device 100 may adjust the size of the scan ROI from the first size to a second size, based on detecting the predetermined object.

In operation 1640, the electronic device 100 may display an intraoral image based on the adjusted scan ROI having the second size.

In operation 1650, the electronic device 100 may determine that the predetermined object is no longer detected in the scan ROI having the second size.

In operation 1660, based on determining that the predetermined object is no longer detected in the scan ROI having the second size, the electronic device 100 may adjust the size of the scan ROI from the second size to the first size.

In operation 1670, the electronic device 100 may display an intraoral image based on the adjusted scan ROI having the first size.

Figure 17:
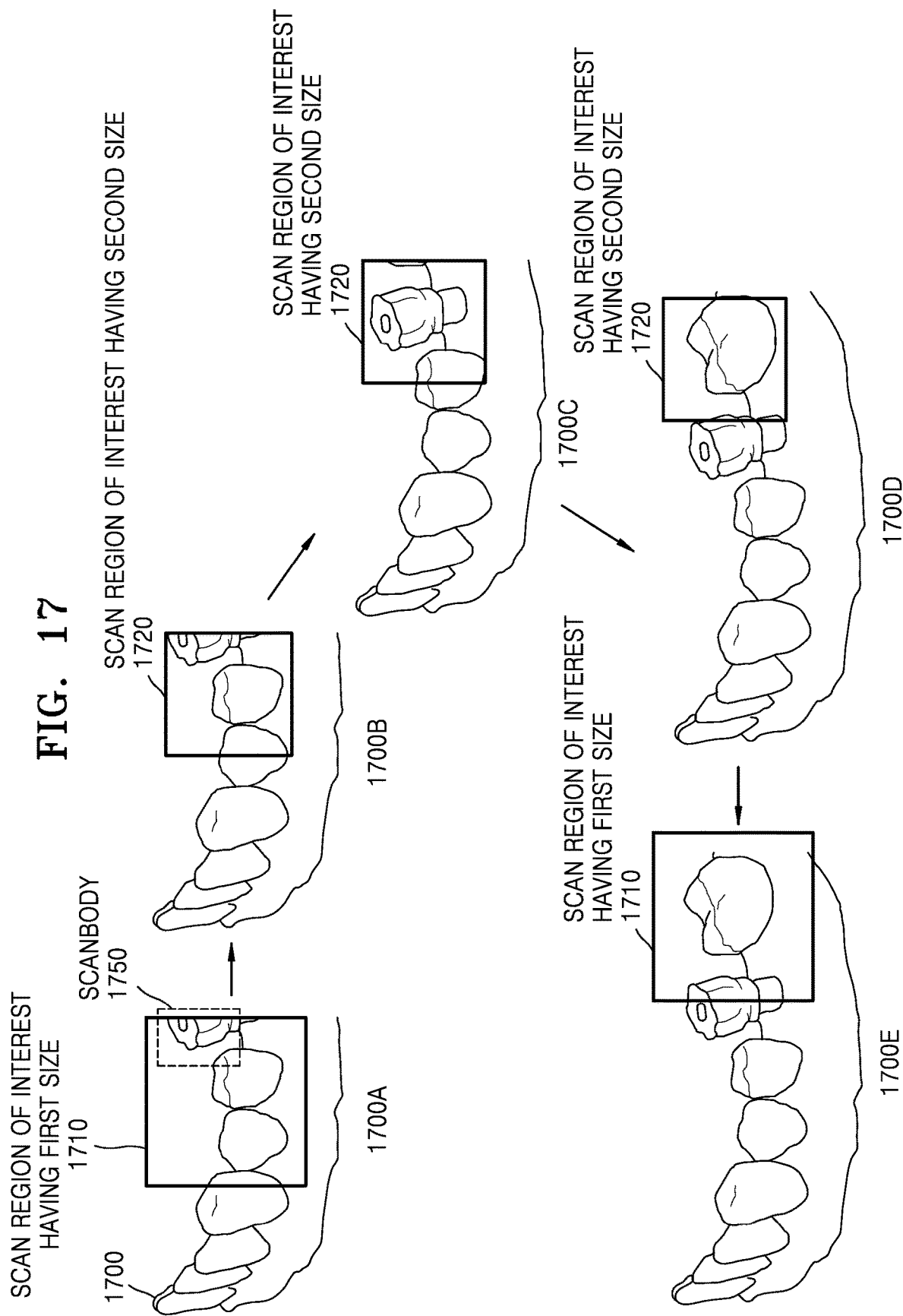
FIG. 17 is a reference diagram for describing an example of a method of processing an intraoral image according to operations illustrated in FIG. 16.

FIG. 17 is a reference diagram for describing an example of a method of processing an intraoral image according to the operations illustrated in FIG. 16.

Referring to FIG. 17, the electronic device 100 may display an intraoral image based on a scan ROI 1710 having a first size (1700A). As such, in a case in which the electronic device 100 detects a predetermined object 1750 such as a scan body in the scan ROI 1710 having the first size while processing the intraoral image based on the scan ROI 1710 having the first size, the electronic device 100 may adjust the scan ROI 1710 having the first size to be a scan ROI 1720 having a second size (1700B). When the electronic device 100 adjusts the size of the scan ROI to the second size, in order to increase the resolution of an image of the predetermined object, the electronic device 100 may increase the resolution of the image corresponding to the scan ROI having the second size as described above with reference to 1200B of FIG. 12. The electronic device 100 may process and display the intraoral image based on the scan ROI 1720 having the second size (1700C). In a case in which the predetermined object is no longer detected in the scan ROI 1720 having the second size while the electronic device 100 processes the intraoral image based on the scan ROI 1720 having the second size (1700D), the electronic device 100 may adjust again the scan ROI 1720 having the second size to be the scan ROI 1710 having the first size (1700E).

The electronic device 100 operating as described above may obtain an image with an increased resolution for a part of the predetermined object detected in the oral cavity. Thus, in a case in which image obtaining is poor because the predetermined object is made of a material such as metal, the electronic device 100 may obtain a more improved intraoral image by increasing the resolution of a region corresponding to the predetermined object.

FIG. 18 illustrates an example of a user interface for asking a user whether to adjust a scan ROI in a case in which the electronic device 100 detects a foreign object or a predetermined object, according to an embodiment.

According to an embodiment, in a case in which the electronic device 100 scanning the oral cavity of a user detects a foreign object other than an object to be scanned is detected in the oral cavity, or a predetermined object, a higher-resolution image of which needs to be obtained, is detected in the oral cavity, the electronic device 100 may adjust the scan ROI. In this case, in a case in which such a foreign object or predetermined object is detected, the electronic device 100 may automatically adjust the scan ROI. Alternatively, in a case in which such a foreign object or predetermined object is detected, the electronic device 100 may output a user interface for asking the user whether to adjust the scan ROI, and based on receiving a response of the user, adjust the scan ROI.

Referring to 1800A of FIG. 18, in a case in which the electronic device 100 detects a predetermined object 1810 such as a scanbody in a first scan ROI 1830 while displaying an intraoral image 1820 based on the first scan ROI 1830, the electronic device 100 may output a user interface for asking the user whether to adjust the scan ROI, as the predetermined object has been detected. For example, the electronic device 100 may output a pop-up window 1840 saying <A scanbody has been detected. Would you like to adjust the scan region of interest?> (1800B). Based on receiving a response from the user to adjust the scan ROI in response to the pop-up window 1840, the electronic device 100 may adjust the scan ROI having a first size to be a scan ROI 1850 having a second size. In addition, the electronic device 100 may inform the user that the size of the scan ROI has been adjusted, by outputting a pop-up window 1860 saying <The scan region of interest has been adjusted for high-resolution scanning of the scanbody part> (1800C).

In a case in which the electronic device 100 does not output the pop-up window 1840 for asking the user whether to adjust the scan ROI, and automatically adjusts the scan ROI without asking the user, the electronic device 100 may proceed directly from 1800A to 1800C.

A method of processing an intraoral image according to an embodiment of the present disclosure may be embodied as program instructions executable by various computer devices, and recorded on a computer-readable medium. In addition, an embodiment of the present disclosure may be implemented in a computer-readable recording medium having recorded thereon one or more programs including instructions for executing the method of processing an intraoral image.

The computer-readable recording medium may include program instructions, data files, data structures, or the like separately or in combinations. Here, examples of the computer-readable recording medium may include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are configured to store and execute program instructions.

Here, the machine-readable storage medium may be provided in the form of a non-transitory storage medium. Here, the 'non-transitory storage medium' may mean that the storage medium is a tangible device. In addition, the 'non-transitory storage medium' may include a buffer in which data is temporarily stored.

According to an embodiment, the method of processing an intraoral image according to various embodiments disclosed herein may be included in a computer program product and then provided. The computer program product may be distributed in the form of a machine-readable storage medium (e.g., a CD-ROM). Alternatively, the computer program product may be distributed (e.g., downloaded or uploaded) online through an application store (e.g., PlayStore™, etc.) or directly between two user devices (e.g., smart phones). In detail, the computer program product according to an embodiment of the present disclosure may include a storage medium having recorded thereon a program including at least one instruction for performing the method of processing an intraoral image according to an embodiment of the present disclosure.

Although embodiments have been described above in detail, the scope of the present disclosure is not limited thereto, and various modifications and alterations by those skill in the art using the basic concept of the present disclosure defined in the following claims also fall within the scope of the present disclosure.

The invention claimed is:

1. A method of processing an intraoral image in a data processing device, the method comprising:
displaying, on a first window of a display, an image of a first three-dimensional virtual model, and on a second window of the display, two-dimensional image data corresponding to a scan region of interest having a first size, which is received from an intraoral scanner, wherein the first three-dimensional virtual model is generated by collecting the two-dimensional image data corresponding to the scan region of interest having the first size, which is received from the intraoral scanner;
detecting a predetermined event;
based on detecting the predetermined event, adjusting a size of the scan region of interest from the first size to a second size; and
displaying, on the second window, two-dimensional image data extracted from the scan region of interest having the adjusted second size, and, on the first window, an image of a second three-dimensional virtual model which is generated by the two-dimensional image data based on the scan region of interest having the adjusted second size.

2. The method of claim 1, wherein the predetermined event comprises at least one of receiving a user input for instructing to adjust the size of the scan region of interest, detecting a foreign object in the two-dimensional image data, or detecting a predetermined object in the two-dimensional image data.

3. The method of claim 2, wherein an interface for receiving the user input for instructing to adjust the size of the scan region of interest is implemented by a user interface in an intraoral scanner or a graphical user interface of the data processing device.

4. The method of claim 2, further comprising increasing or decreasing the size of the scan region of interest, according to the user input.

5. The method of claim 4, further comprising, based on decreasing the size of the scan region of interest, increasing a resolution of the scan region of interest.

6. The method of claim 2, further comprising using one or more neural networks to detect the foreign object in the two-dimensional image data.

7. The method of claim 1, further comprising:
transmitting, through a communication interface, to the intraoral scanner, a control signal indicating adjusting the size of the scan region of interest from the first size to the second size;
in response to the transmitting of the control signal, receiving, through the communication interface, from the intraoral scanner, scan data corresponding to the second size of the scan region of interest; and
generating the second three-dimensional virtual model by the two-dimensional image data corresponding to the scan region of interest having the second size, based on the received scan data.

8. The method of claim 1, wherein the predetermined object detected in the two-dimensional image data comprises a dental treatment auxiliary device made of a particular material.

9. The method of claim 1, wherein the two-dimensional image data corresponding to the scan region of interest having the first size, is received from the intraoral scanner, in real time.

10. A device for processing an intraoral image, the device comprising:
a processor; and
a memory,
wherein the processor is configured to execute one or more instructions stored in the memory to:
display, on a first window of a display, an image of a first three-dimensional virtual model, and on a second window of the display, two-dimensional image data corresponding to a scan region of interest having a first size, which is received from an intraoral scanner, wherein the first three-dimensional virtual model is generated by collecting the two-dimensional image data corresponding to the scan region of interest having the first size, which is received from the intraoral scanner;
detect a predetermined event;
based on detecting the predetermined event, adjust a size of the scan region of interest from the first size to a second size; and
display, on the second window, two-dimensional image data extracted from the scan region of interest having the adjusted second size, and, on the first window, an image of a second three-dimensional virtual model which is generated by the two-dimensional image data based on the scan region of interest having the adjusted second size.

11. The device of claim 10, wherein the predetermined event comprises at least one of receiving a user input for instructing to adjust the size of the scan region of interest, detecting a foreign object in the two-dimensional image data, or detecting a predetermined object in the two-dimensional image data.

12. The device of claim 11, wherein an interface for receiving the user input for instructing to adjust the size of the scan region of interest is implemented by a user interface in an intraoral scanner or a graphical user interface of the device processing the intraoral image.

13. The device of claim 11, wherein the processor is further configured to execute the one or more instructions stored in the memory to increase or decrease the size of the scan region of interest, according to the user input.

14. The device of claim 13, wherein the processor is further configured to execute the one or more instructions stored in the memory to, based on decreasing the size of the scan region of interest, increasing a resolution of the scan region of interest.

15. The device of claim 11, wherein the processor is further configured to execute the one or more instructions stored in the memory to use one or more neural networks to detect the foreign object in the two-dimensional image data.

16. The device of claim 11, wherein the predetermined object detected in the two-dimensional image data comprises a dental treatment auxiliary device made of a particular material.

17. The device of claim 10, wherein the processor is further configured to execute the one or more instructions stored in the memory to:
- transmit, through a communication interface, to the intraoral scanner, a control signal indicating adjusting the size of the scan region of interest from the first size to the second size;
- in response to the transmitting of the control signal, receive, through the communication interface, from the intraoral scanner, scan data corresponding to the second size of the scan region of interest; and
- generate the second three-dimensional virtual model by the two-dimensional image data corresponding to the scan region of interest having the second size, based on the received scan data.

18. The device of claim 10, wherein the two-dimensional image data corresponding to the scan region of interest having the first size, is received from the intraoral scanner, in real time.

19. A non-transitory computer-readable recording medium having recorded thereon a program comprising at least one instruction for a computer to perform a method of processing an intraoral image, the method comprising:
- displaying, on a first window of a display, an image of a first three-dimensional virtual model, and on a second window of the display, two-dimensional image data corresponding to a scan region of interest having a first size, which is received from an intraoral scanner, wherein the first three-dimensional virtual model is generated by collecting the two-dimensional image data corresponding to the scan region of interest having the first size, which is received from the intraoral scanner;
- detecting a predetermined event;
- based on detecting the predetermined event, adjusting a size of the scan region of interest from the first size to a second size; and
- displaying, on the second window, two-dimensional image data extracted from the scan region of interest having the adjusted second size, and, on the first window, an image of a second three-dimensional virtual model which is generated by the two-dimensional image data based on the scan region of interest having the adjusted second size.

20. The non-transitory computer-readable recording medium of claim 19, wherein the two-dimensional image data corresponding to the scan region of interest having the first size, is received from the intraoral scanner, in real time.

* * * * *